United States Patent
Sasaki et al.

(10) Patent No.: US 9,129,518 B2
(45) Date of Patent: Sep. 8, 2015

(54) DEVICE CONTROL SYSTEM, WIRELESS CONTROL APPARATUS, AND COMPUTER READABLE RECORDING MEDIUM

(75) Inventors: Tomoaki Sasaki, Mie (JP); Shigehiro Miura, Mie (JP); Taku Haraguchi, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 74 days.

(21) Appl. No.: 14/235,722

(22) PCT Filed: Aug. 23, 2012

(86) PCT No.: PCT/JP2012/071365
§ 371 (c)(1),
(2), (4) Date: Jan. 28, 2014

(87) PCT Pub. No.: WO2013/027809
PCT Pub. Date: Feb. 28, 2013

(65) Prior Publication Data
US 2014/0169796 A1    Jun. 19, 2014

(30) Foreign Application Priority Data
Aug. 24, 2011    (JP) ................................. 2011-182527

(51) Int. Cl.
*H04B 10/00*    (2013.01)
*G08C 23/04*    (2006.01)
(Continued)

(52) U.S. Cl.
CPC ................ *G08C 23/04* (2013.01); *H04B 10/11* (2013.01); *H04B 10/1143* (2013.01); *H05B 37/0272* (2013.01); *G08C 2201/30* (2013.01)

(58) Field of Classification Search
CPC .... H04B 10/11; H04B 10/112; H04B 10/114; H04B 10/1143; G08C 23/042; G08C 2204/30

USPC .................................................. 398/106–112
See application file for complete search history.

(56) References Cited

U.S. PATENT DOCUMENTS 4,792,995 A * 12/1988 Harding .......................... 398/109
5,444,439 A *  8/1995 Kuroda et al. ............... 340/4.35
(Continued)

FOREIGN PATENT DOCUMENTS

JP    02-301298    12/1990
JP    08-172680    7/1996
(Continued)

OTHER PUBLICATIONS

International Search Report for corresponding International Application No. PCT/JP2012/071365 mailed Oct. 9, 2012.
(Continued)

*Primary Examiner* — Li Liu
(74) *Attorney, Agent, or Firm* — Renner, Otto, Boisselle & Sklar, LLP

(57) ABSTRACT

The device control system includes: a device controller connected to a load device via a signal line; a wireless master connected to the signal line; and a wireless slave. The device controller outputs a first control signal indicative of an intended state of the load device when receiving a second control signal from the wireless slave via the wireless master or receiving via the signal line a third control signal sent in response to a state check signal. When receiving a state change notice sent in response to the first control signal, the device controller sends the state change notice to the wireless master. When receiving the state change notice, the wireless master sends the received state change notice to the wireless slave.

14 Claims, 11 Drawing Sheets

(51) Int. Cl.
*H04B 10/114* (2013.01)
*H04B 10/11* (2013.01)
*H05B 37/02* (2006.01)

(56) References Cited

U.S. PATENT DOCUMENTS

| | | | |
|---|---|---|---|
| 8,175,463 B2 * | 5/2012 | Elberbaum | 398/141 |
| 8,331,795 B2 * | 12/2012 | Elberbaum | 398/141 |
| 2009/0249002 A1 * | 10/2009 | Imahara et al. | 711/161 |
| 2012/0001738 A1 * | 1/2012 | Hilgers | 340/12.5 |
| 2012/0183298 A1 * | 7/2012 | Elberbaum | 398/112 |
| 2012/0320955 A1 * | 12/2012 | Ueda et al. | 375/219 |
| 2013/0120112 A1 * | 5/2013 | Zhao | 340/5.64 |
| 2013/0314339 A1 * | 11/2013 | Ueki et al. | 345/173 |
| 2014/0167934 A1 * | 6/2014 | Fair et al. | 340/12.32 |

FOREIGN PATENT DOCUMENTS

| | | | | |
|---|---|---|---|---|
| JP | 2000-012244 | | 1/2000 | |
| JP | 2000-341768 | | 12/2000 | |
| JP | 2000-341769 | | 12/2000 | |
| JP | 2008-172806 | * | 7/2008 | ............... H04Q 9/00 |
| JP | 2009-237936 | * | 10/2009 | ............. G06F 11/30 |
| JP | 2010-010939 | | 1/2010 | |
| JP | 2010-232799 | | 10/2010 | |
| JP | 2011-151630 | * | 4/2011 | ............... H04Q 9/00 |
| JP | 2011-151630 | | 8/2011 | |

OTHER PUBLICATIONS

PCT/ISA/237 for corresponding International Application No. PCT/JP2012/071365 dated Oct. 9, 2012.

* cited by examiner

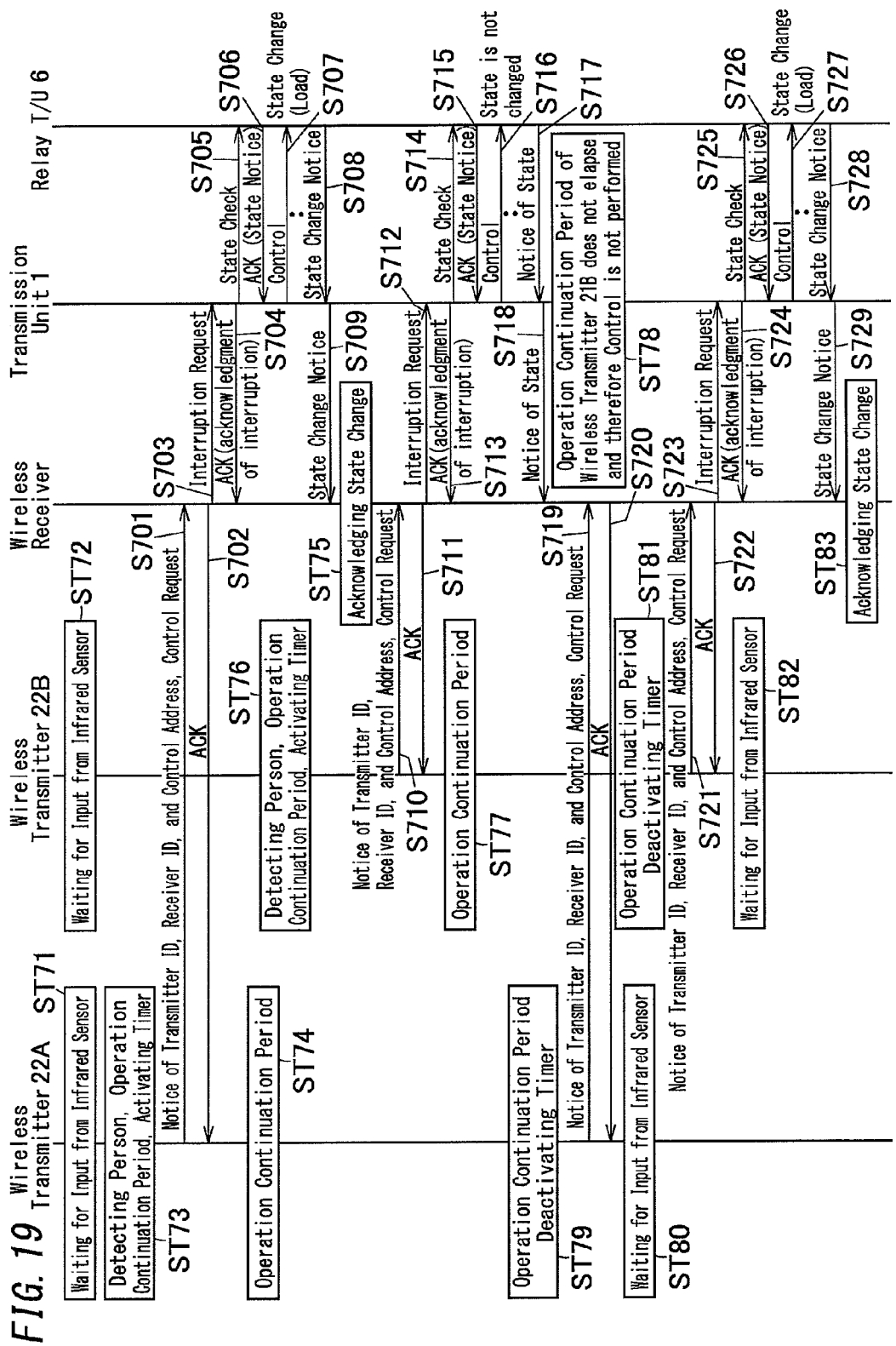

DEVICE CONTROL SYSTEM, WIRELESS CONTROL APPARATUS, AND COMPUTER READABLE RECORDING MEDIUM

TECHNICAL FIELD

The present invention relates to a device control system, a wireless control device, and a computer readable recording medium which are used for controlling a device such as lighting.

BACKGROUND ART

JP 2010-232799 A discloses a remote control system (device control system) employing infrared sensors.

In this remote control system, a central controller is connected to a terminal device for an infrared sensor. The terminal device for the infrared sensor is included in a remote control and monitoring system. The central controller communicates with the terminal device for the infrared sensor in a multiplex transmission system.

This terminal device for the infrared sensor includes a main unit, a manual operation unit, and a slave unit. The main unit is connected to a signal line (tangible line). The main unit sends and receives a transmission signal in a multiplex transmission system. The manual operation unit is connected to the main unit via a dedicated line. The slave unit is connected to the main unit via a dedicated line. The manual operation unit receives a manual operation input, and communicates with the main unit, thereby changing parameters of various configurations of the terminal device for the infrared sensor. As described above, providing the manual operation unit separate from the main unit enables change of the parameters of the terminal device for the infrared sensor in a shorter amount of time than in a multiplex transmission system.

The terminal device for the infrared sensor is connected to the central controller via a tangible signal line. When a layout change requires rearrangement of the infrared sensor, an additional work is necessary in order to change a position of the infrared sensor in some cases.

In the prior configuration, the infrared sensor terminal is installed freely, and a detection value of this infrared sensor terminal is received by a receiver connected to a tangible signal line. When the terminal device for the infrared sensor is separated into an infrared sensor terminal and a receiver, communication between the infrared sensor terminal and the receiver is necessary. Therefore, this terminal device for the infrared sensor is required to have an improved response speed in communication.

SUMMARY OF INVENTION

In view of the above insufficiency, the present invention has aimed to propose a device control system, a wireless control apparatus, and a computer readable recording medium capable of achieving an improved response speed in communication even when a wireless terminal is separated into a transmitter and a receiver.

The device control system of the first aspect in accordance with the present invention includes: a device controller which is to be connected to a load device via a signal line and is configured to output to the signal line a first control signal for controlling the load device; a wireless master which is connected to the device controller via the signal line and is configured to perform wired communication with the device controller; and a wireless slave configured to perform wireless communication with the wireless master. The wireless slave is configured to send to the wireless master a second control signal indicative of an intended state of the load device. The wireless master is configured to, when receiving the second control signal from the wireless slave, send the second control signal to the device controller. The device controller is configured to, when receiving the second control signal from the wireless master, output to the signal line the first control signal corresponding to the second control signal. The device controller is configured to, when receiving a state change notice indicative of a current state of the load device after sending the first control signal corresponding to the second control signal, send the received state change notice to the wireless master. The device controller is configured to output a state check signal to the signal line at a predetermined timing. The device controller is configured to, when receiving a third control signal indicative of an intended state of the load device via the signal line after sending the state check signal, output the first control signal corresponding to the third control signal to the signal line. The device controller is configured to, when receiving the state change notice after sending the first control signal corresponding to the third control signal, send the received state change notice to the wireless master. The wireless master is configured to, when receiving the state change notice from the device controller, send the received state change notice to the wireless slave.

According to the device control system of the second aspect in accordance with the present invention, in addition to the first aspect, the wireless master is configured to store the current state of the load device and a correspondence relation between the load device and the wireless slave. The wireless master is configured to, when receiving the state change notice from the device controller, determine whether the current state of the load device indicated by the state change notice is identical to the current state of the load device stored. The wireless master is configured to, when determining that the current state of the load device indicated by the state change notice is not identical to the current state of the load device stored, send the received state change notice to the wireless slave corresponding to the load device indicated by the received state change notice.

According to the device control system of the third aspect in accordance with the present invention, in addition to the first or second aspect, the wireless master is configured to, when receiving the second control signal from the wireless slave, store the intended state of the load device indicated by the second control signal as the current state of the load device.

According to the device control system of the fourth aspect in accordance with the present invention, in addition to any one of the first to third aspects, the wireless slave is configured to determine whether a predetermined event has occurred, and when determining that the predetermined event has occurred send the second control signal to the wireless master.

According to the device control system of the fifth aspect in accordance with the present invention, in addition to the fourth aspect, the wireless slave is configured to perform an event determination process of determining periodically whether the predetermined event has occurred while a state of the load device is a first state. The wireless slave is configured to, when determining that the predetermined event has occurred, send the second control signal indicative of a second state different from the first state as the intended state of the load device.

According to the device control system of the sixth aspect in accordance with the present invention, in addition to the fifth aspect, the wireless slave is configured to send the second control signal indicative of the first state as the intended state of the load device after a lapse of a predetermined operation continuation period from time of sending the second control signal. The wireless slave is configured to, when determining that a state of the load device is the first state after sending the second control signal, perform the event determination process.

According to the device control system of the seventh aspect in accordance with the present invention, in addition to the sixth aspect, the wireless master is configured to, when receiving the second control signal indicative of the first state as the intended state of the load device, send an acknowledgement to the wireless slave. The wireless slave is configured to, when receiving the acknowledgement from the wireless master, determine that a state of the load device is the first state.

According to the device control system of the eighth aspect in accordance with the present invention, in addition to the sixth or seventh aspect, the wireless slave is configured to, when receiving the state change notice from the wireless master, determine whether the current state of the load device indicated by the received state change notice is the first state.

According to the device control system of the ninth aspect in accordance with the present invention, in addition to any one of the first to eighth aspects, the device control system further comprises a terminal controller interposed between the load device and the device controller. The terminal controller is configured to, when receiving the first control signal from the device controller via the signal line, control the load device according to the received first control signal. The terminal controller is configured to, after controlling the load device, send the change state notice to the device controller.

According to the device control system of the tenth aspect in accordance with the present invention, in addition to the ninth aspect, the terminal controller is configured to, when receiving the state check signal when having received a state change request for requesting a change of a state of the load device, send, to the device controller, the third control signal indicative of a state requested by the state change request as the intended state of the load device.

According to the device control system of the eleventh aspect in accordance with the present invention, in addition to the tenth aspect, the device control system further comprises a manual operation controller connected to the signal line. The manual operation controller is configured to send the state change request to the terminal controller via the signal line.

According to the device control system of the twelfth aspect in accordance with the present invention, in addition to any one of the sixth to eighth aspect, the device controller is configured to, after outputting the first control signal to the signal line, output the state check signal to the signal line before a lapse of the operation continuation period.

The wireless control apparatus in accordance with the present invention is a wireless control apparatus to be connected to a device controller via a signal line and configured to perform wired communication with the device controller and to perform wireless communication with a wireless slave. The device controller is to be connected to a load device via the signal line and is configured to output to the signal line a first control signal for controlling the load device. The wireless slave is configured to send to the wireless control apparatus a second control signal indicative of an intended state of the load device. The wireless control apparatus is configured to, when receiving the second control signal from the wireless slave, send the second control signal to the device controller. The device controller is configured to, when receiving the second control signal from the wireless control apparatus, output to the signal line the first control signal corresponding to the second control signal. The device controller is configured to, when receiving a state change notice indicative of a current state of the load device after sending the first control signal corresponding to the second control signal, send the received state change notice to the wireless master. The device controller is configured to output a state check signal to the signal line at a predetermined timing. The device controller is configured to, when receiving a third control signal indicative of an intended state of the load device via the signal line after sending the state check signal, output the first control signal corresponding to the third control signal to the signal line. The device controller is configured to, when receiving the state change notice after sending the first control signal corresponding to the third control signal, send the received state change notice to the wireless control apparatus. The wireless control apparatus is configured to, when receiving the state change notice from the device controller, send the received state change notice to the wireless slave.

The computer readable recording medium in accordance with the present invention is a computer readable recording medium storing a program used in a computer which is connected to a device controller via a signal line and is used for performing wired communication with the device controller and wireless communication with a wireless slave. The program enables the computer to act as a wireless control apparatus. The device controller is to be connected to a load device via the signal line and is configured to output to the signal line a first control signal for controlling the load device. The wireless slave is configured to send to the wireless control apparatus a second control signal indicative of an intended of the load device. The wireless control apparatus is configured to, when receiving the second control signal from the wireless slave, send the second control signal to the device controller. The device controller is configured to, when receiving the second control signal from the wireless control apparatus, output to the signal line the first control signal corresponding to the second control signal. The device controller is configured to, when receiving a state change notice indicative of a current state of the load device after sending the first control signal corresponding to the second control signal, send the received state change notice to the wireless master. The device controller is configured to output a state check signal to the signal line at a predetermined timing. The device controller is configured to, when receiving a third control signal indicative of an intended state of the load device via the signal line after sending the state check signal, output the first control signal corresponding to the third control signal to the signal line. The device controller is configured to, when receiving the state change notice after sending the first control signal corresponding to the third control signal, send the received state change notice to the wireless control apparatus. The wireless control apparatus is configured to, when receiving the state change notice from the device controller, send the received state change notice to the wireless slave.

BRIEF DESCRIPTION OF THE DRAWINGS

FIG. 19 is a sequence diagram illustrating procedure of turning on or off the load device when the two infrared sensor transmitters have the same address in the above device control system.

DESCRIPTION OF EMBODIMENTS

The device control system of an embodiment according to the present invention is configured to, when detecting an intended status change, change a state of a device to be controlled which is associated with the detected status change. The following explanation relates to an example of the device control system configured to, when detecting a status of a person by an infrared sensor, turn on or off a lighting device associated with the infrared sensor.

Figure 1:
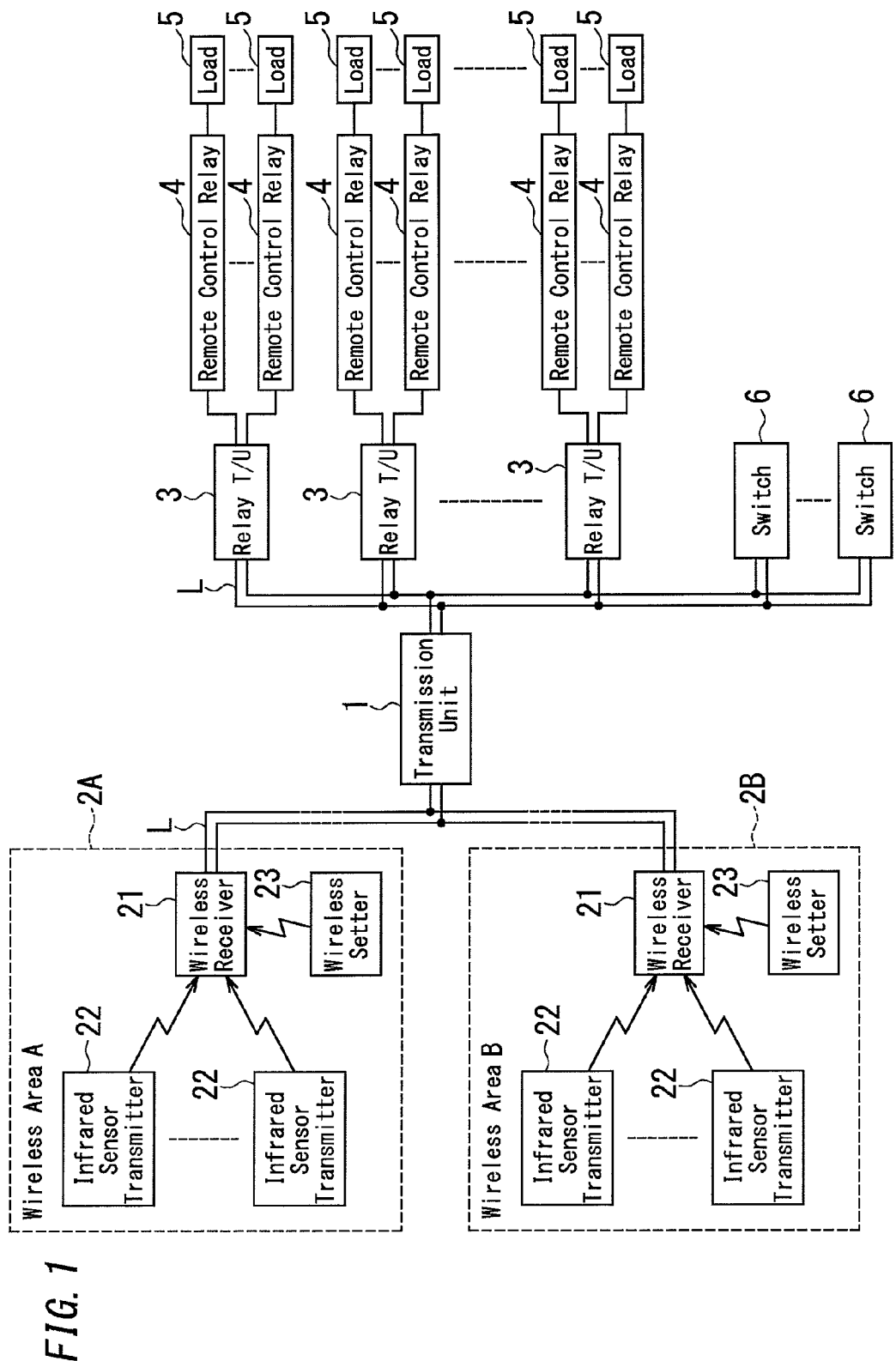
FIG. 1 is a block diagram illustrating a configuration of a device control system of one embodiment in accordance with the present invention.

This device control system is configured as shown in FIG. 1, for example. This device control system includes a transmission unit 1, an electric wave wireless systems 2A and 2B (hereinafter referred collectively to as "electric wave wireless system 2"), a relay terminal unit (relay T/U) 3, a remote control relay 4, a load device 5, and a switch 6.

In this device control system, the transmission unit 1, the electric wave wireless systems 2A and 2B, the relay terminal unit (control terminal device) 3, the switch (operation device) 6 are connected to a multiplexing signal line L. For example, in this device control system, a 2-way signal line is used as the multiplexing signal line L. In this device control system, the transmission unit 1, the electric wave wireless systems 2A and 2B, the relay terminal unit 3, the switch 6 communicate with each other in a time-division multiplexing transmission manner using time-division multiplexing signals.

Each of the electric wave wireless systems 2A and 2B includes a wireless receiver (wireless control apparatus) 21 and at least one infrared sensor transmitter 22. The infrared sensor transmitter 22 serves as a wireless slave communicating with the wireless receiver 21. In contrast, the wireless receiver 21 serves as a wireless master communicating with the infrared sensor transmitters 22.

Figure 2:
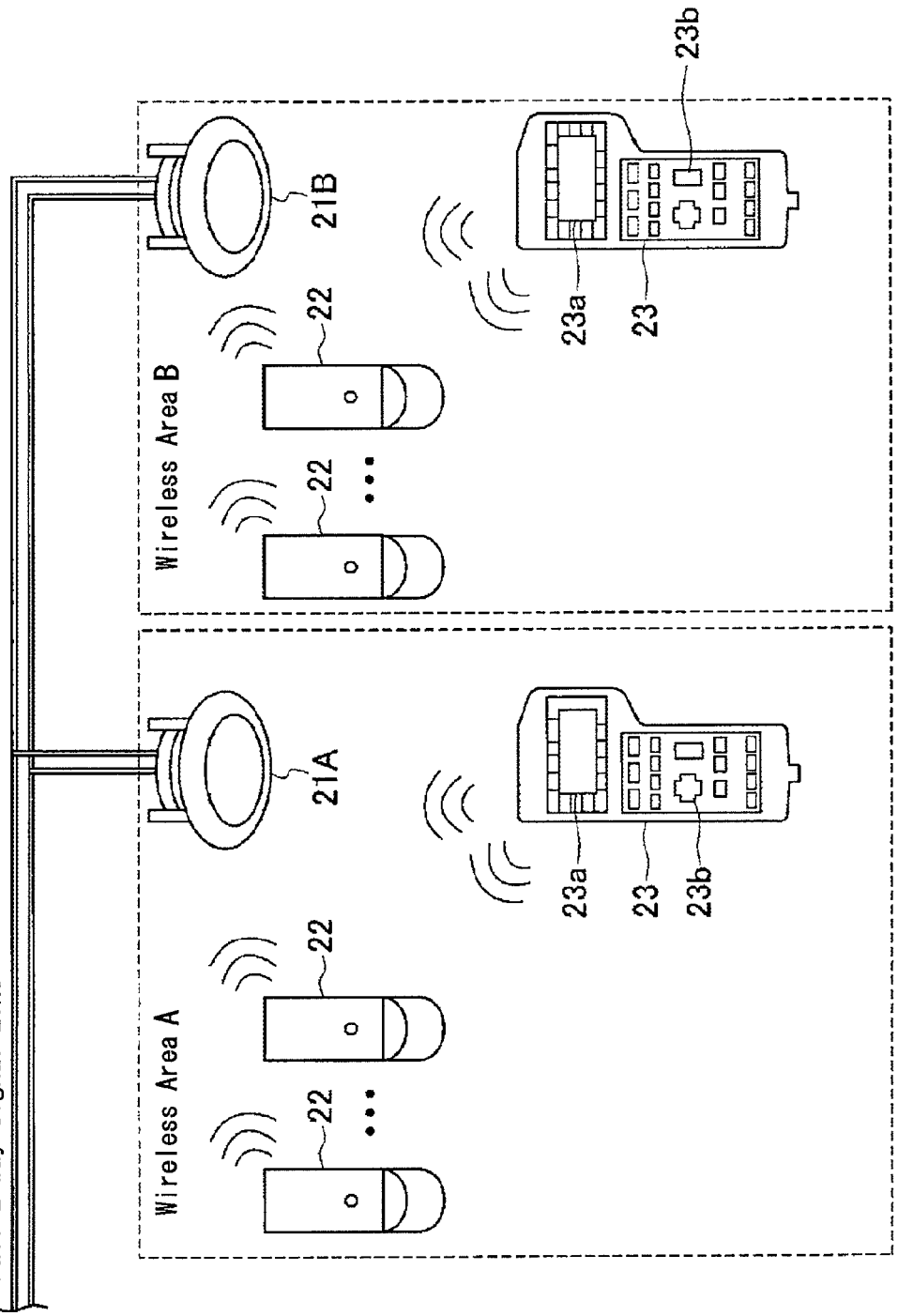
FIG. 2 is a schematic diagram illustrating configurations of electric wave wireless systems of the above device control system.

As shown in FIG. 2, each of the electric wave wireless systems 2A and 2B is configured to allow the wireless receiver (wireless master) 21 and the infrared sensor transmitter (wireless slave) 22 in the same area to communicate with each other, as shown in FIG. 2. Further, the electric wave wireless systems 2A and 2B are installed so as to not receive electric waves from each other. Note that, the infrared sensor transmitter 22 has no function of roaming between the electric wave wireless systems 2A and 2B.

As described above, the device control system of the present embodiment includes: the device controller (transmission unit) 1 which is connected to the load device 5 via the signal line (multiplexing signal line) L and is configured to output a first control signal for controlling the load device 5 to the signal line L; the wireless master (wireless receiver) 21 which is connected to the device controller 1 via the signal line L and is configured to establish wired communication with the device controller 1; and the wireless slave (infrared sensor transmitter) 22 configured to establish wireless communication with the wireless master 21. Further, the device control system of the present embodiment includes the terminal controller (relay terminal unit) 3 interposed between the load device 5 and the device controller 1. Furthermore, the device control system of the present embodiment includes the operation device (switch) 6 connected to the signal line L.

The infrared sensor transmitter (wireless slave) 22 includes an infrared sensor and a transmitter for wireless signals, for example. When detecting a human body, the infrared sensor generates a signal indicative of detection of the human body. When the infrared sensor has detected the human body, the infrared sensor transmitter 22 sends a control request for turning on the load device 5 serving as a lighting fixture to the wireless receiver 21 by use of a wireless signal. Additionally, after a lapse of a predetermined operation continuation period from a time of sending the control request, the infrared sensor transmitter 22 sends a control request for turning off the load device 5 to the wireless receiver 21.

Meanwhile, the wireless receiver 21 provides a state change notice indicative of a state of the load device 5 to the infrared sensor transmitter 22. When determining that the load device 5 is turned off, based on the state change notice, the infrared sensor transmitter 22 sends the control request for turning on the load device 5. In contrast, when determining that the load device 5 is turned on, based on the state change notice, the infrared sensor transmitter 22 sends the control request for turning off the load device 5. As described above, the infrared sensor transmitter 22 changes a transmission content of the control signal (control request) according to the state of the load device 5 associated with the infrared sensor transmitter 22.

The wireless receiver 21 stores a device state indicative of the state of the load device 5 and association information (correspondence relation) of the load device 5 and the infrared sensor transmitter 22.

For example, the device state indicates whether the lighting device serving as the load device 5 is turned on or off. In the present embodiment, the state of the load device 5 includes a first state (extinction; off-state) and a second state (lighting; on-state).

The association information is information indicative of a correspondence relation between an ID of the load device 5 and a transmitter ID of the infrared sensor transmitter 22. Hence, the wireless receiver 21 can send information of the device state to the infrared sensor transmitter 22 only when the device state of the load device 5 is changed.

The wireless master 21 is configured to, when receiving the state change notice from the device controller 1, send the received state change notice to the wireless slave 22.

Particularly, in the present embodiment, the wireless master 21 is configured to store a current state of the load device 5 and the correspondence relation between the load device 5 and the wireless slave 22. The wireless master 21 is configured to, when receiving the state change notice from the device controller 1, determine whether the current state of the load device 5 indicated by the state change notice is identical to the current state of the load device stored. The wireless master 21 is configured to, when determining that the current state of the load device indicated by the state change notice is not identical to the current state of the load device stored, send the received state change notice to the wireless slave 22 corresponding to the load device 5 indicated by the received state change notice.

In brief, the wireless master 21 is configured to, when determining that the current state of the load device indicated by the state change notice is identical to the current state of the load device stored, not send the received state change notice to the wireless slave 22.

The ID (transmitter ID) of one or more infrared sensor transmitters 22 is registered on the wireless receiver (wireless master) 21. An ID registration sequence of registering the ID of the infrared sensor transmitter 22 on this wireless receiver 21 is performed by a wireless setter 23. Note that, this ID registration sequence is described below. Further, the registered transmitter ID of the infrared sensor transmitter 22 can be deleted from the wireless receiver 21. Note that, such an ID deleting sequence is described below.

The transmission unit 1 serves as the device controller. The device controller is configured to monitor states of the infrared sensor transmitter 22, the load device 5, and the switch 6 which serve as terminal devices, and control the states of the terminal devices.

The transmission unit (device controller) 1 performs polling for monitoring the states of the infrared sensor transmitter 22 and the load device 5. Therefore, the transmission unit 1 sends a state check signal to the relay terminal unit 3 every predetermined polling period, and receives the state change notice of the load device 5 from the relay terminal unit 3.

Similarly, the transmission unit 1 sends the state change notice of the load device 5 to the wireless receiver 21 every predetermined polling period. The state change notice sent to the wireless receiver 21 is sent from the wireless receiver 21 to the infrared sensor transmitter 22 associated with this state change notice, if necessary. The state change notice is sent to the infrared sensor transmitter 22 at a timing different from a timing of the polling performed between the transmission unit 1 and the relay terminal unit 3 via the multiplexing signal line L.

An operation of the load device 5 is controlled by the relay terminal unit 3 according to the control request (first control signal) from the transmission unit 1, and accordingly the device state is changed. In the present embodiment, the device state of the load device 5 is changed according to the control request, and consequently the load device 5 is turned on or off.

The relay terminal unit 3 communicates with the transmission unit 1 via the multiplexing signal line L. The relay terminal unit 3 operates the remote control relay 4 in response to reception of the control request from the transmission unit 1. When receiving the control request for turning on the load device 5, the relay terminal unit 3 turns on the remote control relay 4 to energize the load device 5 to change the load device 5 to a lighting state. When receiving the control request for turning off the load device 5, the relay terminal unit 3 turns off the remote control relay 4 to interrupt power supply to the load device 5 to change the load device 5 to an extinction state.

[ID Registration Sequence]

Figure 3:
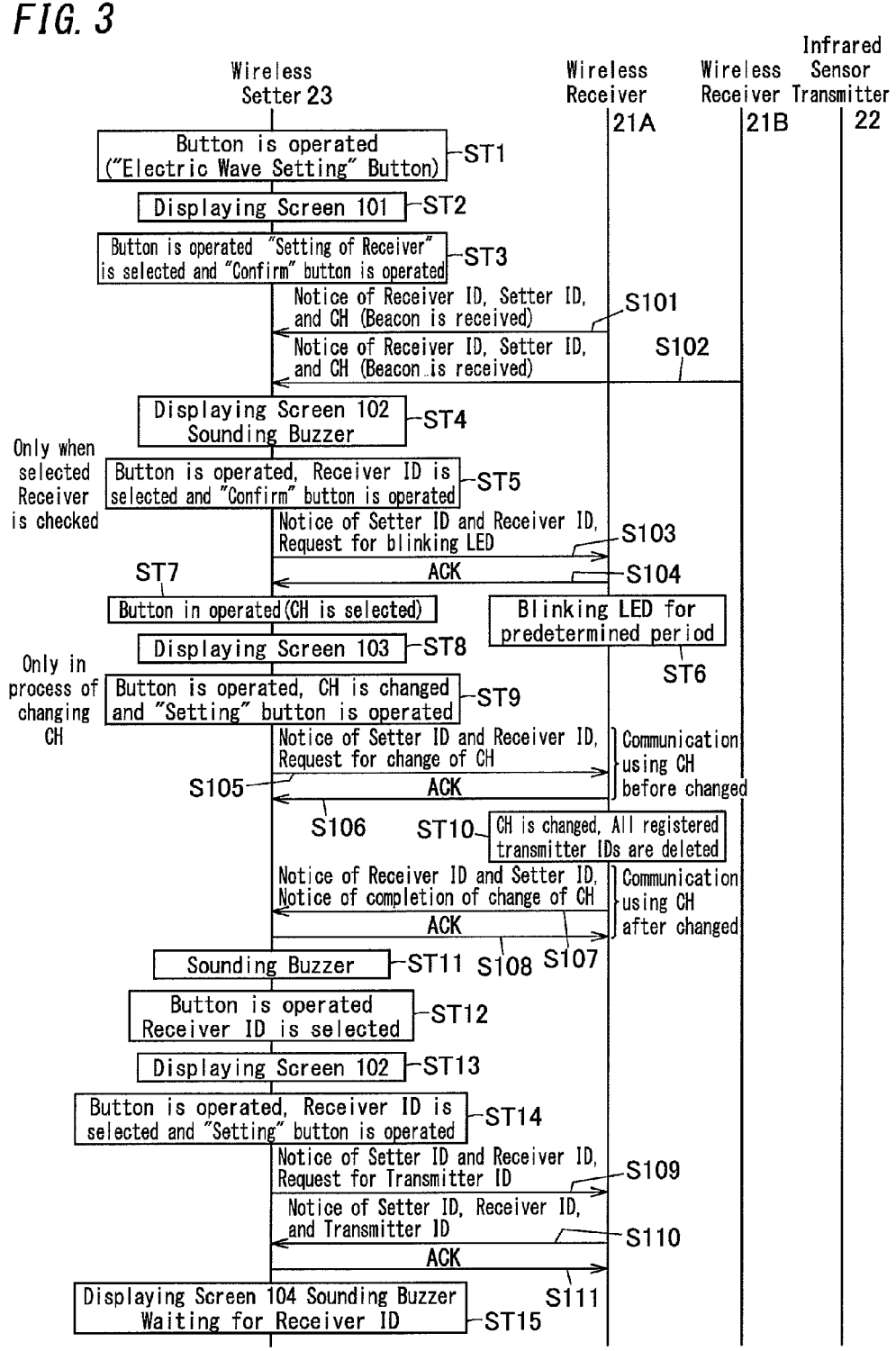
FIG. 3 is a sequence diagram illustrating procedure of registering a transmitter ID of an infrared sensor transmitter on a wireless receiver in the above device control system.

Next, with regard to the above device control system, the sequence of registering the transmitter ID of the infrared sensor transmitter 22 on the wireless receiver 21 is described with reference to FIGS. 3 and 4.

Figure 5:
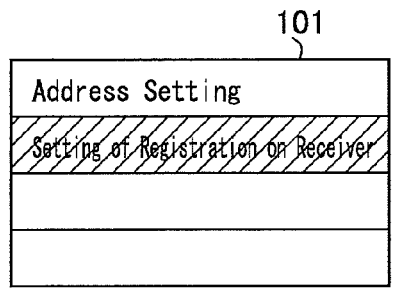
FIG. 5 is a diagram illustrating a screen displayed on a wireless setter in an ID registration sequence in the above device control system.

First, in a step ST1, with regard to the wireless setter 23, an electric wave setting button of a manual operation unit 23b is operated by a setting person. In response to this, in a step ST2, a display unit 23a of the wireless setter 23 displays a screen 101 as shown in FIG. 5. While this screen 101 is displayed, in a step ST3, an item "Setting of Registration on Receiver" on the screen 101 is selected and thereafter a confirm button on the wireless setter 23 is selected.

In this regard, each of the wireless receivers 21A and 21B which are placed in the same area as the wireless setter 23 sends a beacon electric wave including a receiver ID thereof, a setter ID, and a channel notice. After the step ST3 is performed, the wireless setter 23 receives the beacon electric waves from the wireless receivers 21A and 21B (S101 and S102). In a step ST4, responding to reception of the electric waves, the wireless setter 23 displays a screen 102 shown in FIG. 6 and sounds a buzzer.

The displaying of the screen 102 and the sounding of the buzzer notifies the setting person of the presence of the wireless receiver 21 placed in the area in which the wireless setter 23 is placed. This screen 102 shows the receiver ID of the wireless receiver 21 placed in this area and a number of a channel used by this wireless receiver 21. For example, the screen 102 shows that three wireless receivers (1) to (3) of the wireless receivers 21 are detected.

In a next step ST5, the receiver ID is selected according to a manual operation of the setting person, and the confirm button on the wireless setter 23 is selected. For example, the receiver ID of "01234567" associated with the item (1) is selected. In response to this selection, the wireless setter 23 sends a notice including the setter ID thereof and the selected receiver ID, together with an LED blinking request, to the wireless receiver 21A (S103).

When receiving the notice including the selected receiver ID and the LED blinking request, the wireless receiver 21A sends an acknowledgment ACK to the wireless setter (S104). Thereafter, in a step ST6, the wireless receiver 21A blinks an LED which is provided exposed on a housing of the wireless receiver 21A, for a predetermined period.

Figure 7:
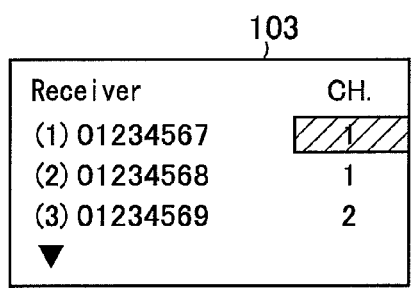
FIG. 7 is a diagram illustrating a screen displayed on the wireless setter in the ID registration sequence in the above device control system.

In a next step ST7, a channel number of "1" associated with the receiver ID selected in the step ST5 is selected by the setting person. Subsequently, in a step ST8, the wireless setter 23 displays a screen 103 in which the channel number of "1"

is highlighted as shown in FIG. 7. In this situation, in a step ST9, the setting person operates a setting button of the wireless setter 23 to select "1" as the channel number and decide that the channel number is "1".

In response to this operation, the wireless setter 23 sends a notice indicative of the setter ID and the selected receiver ID, together with a channel change request, to the wireless receiver 21A (S105). When receiving the notice indicative of the setter ID and the selected receiver ID, and the channel change request, the wireless receiver 21A sends an acknowledgment ACK to the wireless setter 23 (S106). The notice and the request sent from the wireless setter 23 to the wireless receiver 21A and the acknowledgment ACK sent from the wireless receiver 21A to the wireless setter 23 are transmitted by use of the channel before the channel change is performed.

Thereafter, in a step ST10, the wireless receiver 21A changes the channel for sending and receiving future wireless signals, and deletes all of the transmitter IDs registered. After this process is completed, the wireless receiver 21A sends a notice indicative of the receiver ID thereof and the setter ID of the wireless setter 23, together with a channel change completion notice, to the wireless setter 23.

When receiving the notice indicative of the receiver ID of the wireless receiver 21A and the setter ID of the wireless setter 23, and the channel change completion notice, the wireless setter 23 sends an acknowledgment ACK to the wireless receiver 21A (S108). The notices sent from the wireless receiver 21A to the wireless setter 23 and the acknowledgment ACK sent from the wireless setter 23 to the wireless receiver 21A are transmitted by use of the channel after the channel change is performed.

After sending the acknowledgment ACK to the wireless receiver 21A, the wireless setter 23 sounds the buzzer in a step ST11. Thereby, the wireless setter 23 notifies the setting person that the wireless receiver 21A whose receiver ID and channel are selected can be used as a master.

Figure 6:
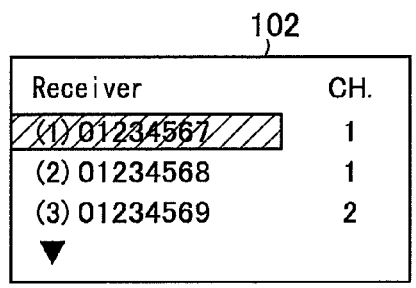
FIG. 6 is a diagram illustrating a screen displayed on the wireless setter in the ID registration sequence in the above device control system.

After that, when an operation of selecting the receiver ID is performed while the wireless setter 23 displays the screen 103 in a step ST12, the wireless setter 23 displays the screen 102 shown in FIG. 6 in a step ST13.

In this situation, with regard to the wireless setter 23, the receiver ID on the screen 102 is selected and subsequently the setting button is operated in a step ST14. In response to this operation, the wireless setter 23 sends a notice indicative of the setter ID of the wireless setter 23 and the receiver ID of the wireless receiver 21A selected as the wireless master, together with a request for the transmitter ID, to the wireless receiver 21A (S109).

When receiving the notice indicative of the setter ID of the wireless setter 23 and the receiver ID of the wireless receiver 21A, and the request for the transmitter ID, the wireless receiver 21A sends a notice indicative of the receiver ID of the wireless receiver 21A, the setter ID, and the transmitter ID, to the wireless setter 23, in response to this (S110). When receiving this notice, the wireless setter 23 sends an acknowledgment ACK to the wireless receiver 21A (S111).

Figure 8:
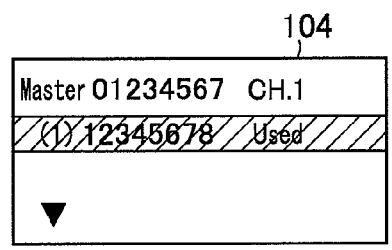
FIG. 8 is a diagram illustrating a screen displayed on the wireless setter in the ID registration sequence in the above device control system.

Thereafter, in a step ST15, the wireless setter 23 displays a screen 104 shown in FIG. 8. This screen 104 shows the receiver ID of "01234567" and the channel number of "1" of the wireless master in the area, and information indicating that the ID of "1234567" of the transmitter ID included in the notice is already used.

Figure 4:
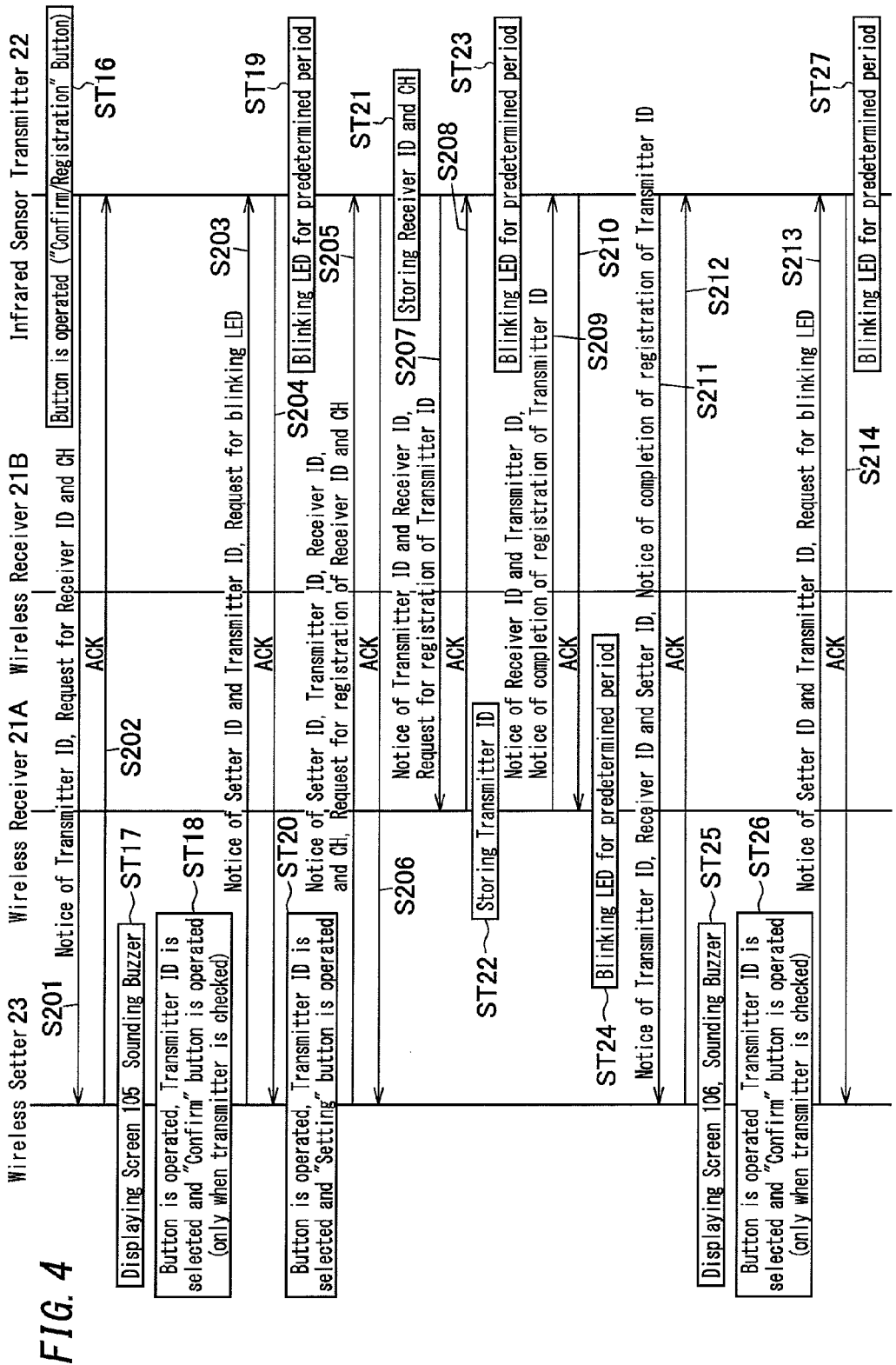
FIG. 4 is a sequence diagram illustrating the procedure of registering the transmitter ID of the infrared sensor transmitter on the wireless receiver in the above device control system.

After that, as shown in FIG. 4, when a check/registration button is operated with regard to the infrared sensor transmitter 22 in a step ST16, the infrared sensor transmitter 22 sends a notice of the transmitter ID of the infrared sensor transmitter 22, together with a request for the receiver ID and the channel number (S201).

Figure 9:
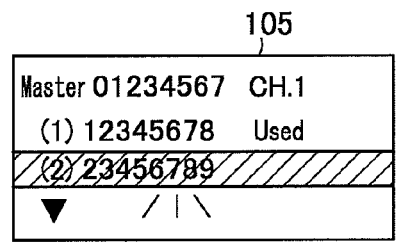
FIG. 9 is a diagram illustrating a screen displayed on the wireless setter in the ID registration sequence in the above device control system.

When receiving the notice of the transmitter ID and the request for the receiver ID and the channel number from the infrared sensor transmitter 22, the wireless setter 23 returns an acknowledgment ACK (S202). In this situation, in a step ST17, the wireless setter 23 displays a screen 105 which shows the new transmitter ID of "23456789" of the infrared sensor transmitter 22 as shown in FIG. 9 and the wireless setter 23 sounds the buzzer.

In a next step ST18, with regard to the wireless setter 23, the transmitter ID of "23456789" on the screen 105 is selected and the confirm button is operated by the setting person.

In response to this operation, the wireless setter 23 sends a notice indicative of the setter ID of the wireless setter 23 and the transmitter ID, together with an LED blinking request, to the infrared sensor transmitter 22 (S203).

When receiving the notice indicative of the setter ID and the transmitter ID, and the LED blinking request, the infrared sensor transmitter 22 returns an acknowledge ACK (S204). In a step ST19, the infrared sensor transmitter 22 blinks an LED for a predetermined period in accordance with the LED blinking request. As a result, by watching the LED of the infrared sensor transmitter 22, the setting person can know that the infrared sensor transmitter 22 is an object to be set.

After the wireless setter 23 receives the acknowledgment ACK, the transmitter ID of "23456789" on the screen 105 is selected and the setting button is operated in a step ST20. In response to this operation, the wireless setter 23 sends a notice indicative of the setter ID of the wireless setter 23, the transmitter ID, the receiver ID, and the channel number, together with a request for registering the receiver ID and the channel number, to the infrared sensor transmitter 22 (S205). In this regard, the transmitter ID is an ID allocated to the infrared transmitter 22 selected. The receiver ID is an ID of the wireless receiver 21 serving as the wireless master. The channel number is a number allocated to the wireless master.

When receiving the notice and the request, the infrared sensor transmitter 22 returns an acknowledgment ACK (S206).

In a step ST21, the infrared sensor transmitter 22 stores the received receiver ID and channel number of the wireless receiver 21 serving as the wireless master.

Subsequently, the infrared sensor transmitter 22 sends a notice indicative of the transmitter ID and the receiver ID, together with a request for registering the transmitter ID, to the wireless receiver 21A (S207).

When receiving the notice indicative of the transmitter ID and the receiver ID, and the request for registering the transmitter ID, the wireless receiver 21A returns an acknowledgment ACK (S208).

When receiving the acknowledgment ACK, the infrared sensor transmitter 22 blinks the LED for a predetermined period in a step ST23. Therefore, the setting person can confirm success of storing the receiver ID and allocated channel number of the wireless receiver 21A serving as the wireless master in the area in the infrared sensor transmitter 22.

Further, in a step ST22, the wireless receiver 21A stores the transmitter ID included in the notice. Thereafter, the wireless receiver 21A sends a notice indicative of the receiver ID thereof and the transmitter ID, together with a registration completion notice of the transmitter ID, to the infrared sensor transmitter 22 (S209).

When receiving these notices, the infrared sensor transmitter 22 sends an acknowledgment ACK to the wireless receiver 21A (S210).

When receiving the acknowledgment ACK, the wireless receiver 21A blinks the LED for a predetermined period in a step ST24. Therefore, the setting person can confirm success of storing the transmitter ID of the infrared sensor transmitter 22 serving as the wireless slave in the wireless receiver 21A serving as the wireless master.

After that, the infrared sensor transmitter 22 sends a notice indicative of the transmitter ID of the infrared sensor transmitter 22, the receiver ID of the wireless receiver 21A, and the setter ID, together with a notice of completion of registering the transmitter ID on the wireless receiver 21A, to the wireless setter 23 (S211).

When receiving the notice of completion of registering the transmitter ID from the infrared sensor transmitter 22, the wireless setter 23 returns an acknowledgment ACK (S212).

Figure 10:
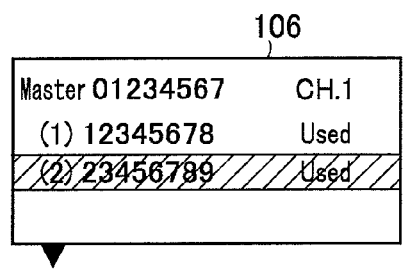
FIG. 10 is a diagram illustrating a screen displayed on the wireless setter in the ID registration sequence in the above device control system.

In response to reception of the notice of completion of registering, the wireless setter 23 displays a screen 106 shown in FIG. 10 and sounds the buzzer in a step ST25. According to the displaying of the screen 106 and the sounding of the buzzer, the blinking highlighted indication on the screen 105 is terminated, and the setting person is notified that the infrared sensor transmitter 22 serving as the wireless slave is registered on the wireless receiver 21A serving as the wireless master.

While the screen 106 is displayed, the setting person selects the transmitter ID of "23456789" and operates the confirm button in a step ST26. In response to this operation, the wireless setter 23 sends a notice indicative of the setter ID thereof and the transmitter ID corresponding to the wireless slave, together with an LED blinking request, to the infrared sensor transmitter 22 (S213).

When receiving the notice and the LED blinking request, the infrared sensor transmitter 22 returns an acknowledgment ACK (S214), and blinks the LED for a predetermined period in a step S27. Accordingly, the setting person can confirm the completion of the registration of the infrared sensor transmitter 22 as the wireless slave.

According to the ID registration sequence described above, the device control system can register IDs on each of the wireless receiver 21 serving as the wireless master and the infrared sensor transmitter 22 serving as the wireless slave, by use of the wireless setter 23.

[ID Deleting Sequence]

Figure 11:
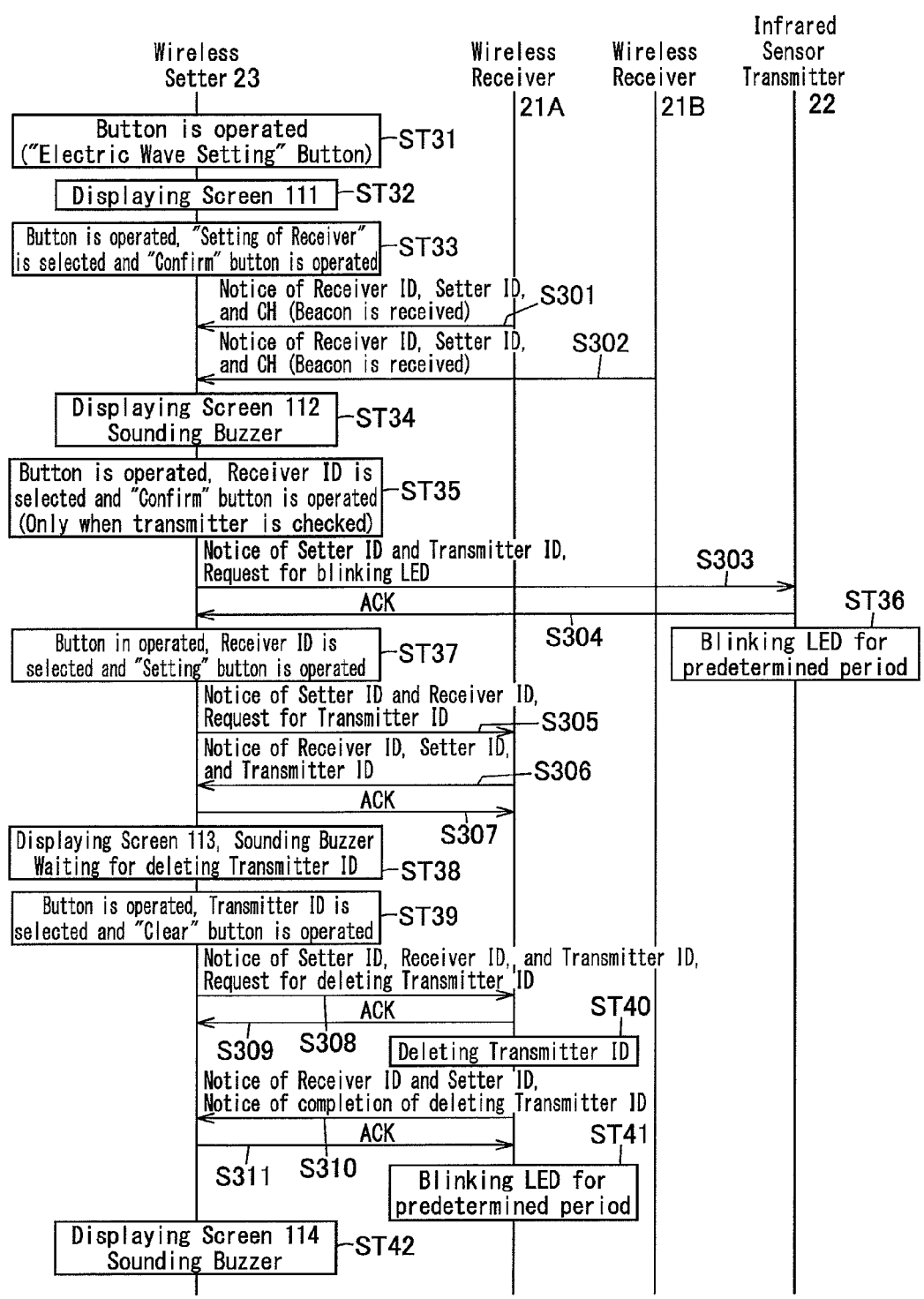
FIG. 11 is a sequence diagram illustrating procedure of deleting the transmitter ID registered on the wireless receiver in the above device control system.

The following explanation referring to FIG. 11 is made to an ID deleting sequence of deleting the transmitter ID registered on the wireless receiver 21 through the above ID registration sequence.

Figure 12:
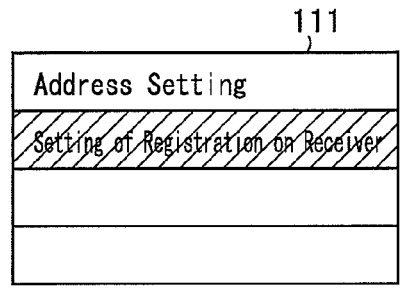
FIG. 12 is a diagram illustrating a screen displayed on the wireless setter in an ID deleting sequence in the above device control system.

First, in a step ST31, the electric wave setting button of the wireless setter 23 is operated by the setting person. In response to this operation, the wireless setter 23 displays a screen 111 for address setting shown in FIG. 12 in a step ST32. While this screen 111 is displayed, in a step ST33, with regard to the wireless setter 23, the setting person selects the item "Setting of Registration on Receiver" and thereafter operates the confirm button on the wireless setter 23.

Figure 13:
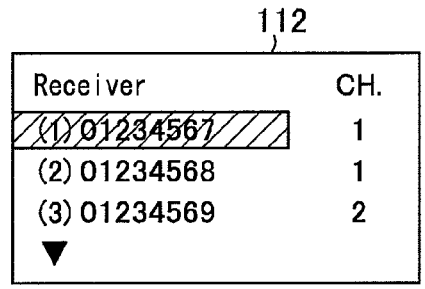
FIG. 13 is a diagram illustrating a screen displayed on the wireless setter in the ID deleting sequence in the above device control system.

In this regard, each of the wireless receivers 21A and 21B which are placed in the same area as the wireless setter 23 sends the beacon electric wave including the receiver ID thereof, the setter ID, and the channel notice. After the step ST33 is performed, the wireless setter 23 receives the beacon electric waves from the wireless receivers 21A and 21B (S301 and S302). In a step ST43, responding to reception of the electric waves, the wireless setter 23 displays a screen 112 shown in FIG. 13 and sounds the buzzer.

The displaying of the screen 112 and the sounding of the buzzer notifies the setting person of the presence of the wireless receiver 21 placed in the area in which the wireless setter 23 is placed. This screen 112 shows the receiver ID of the wireless receiver 21 placed in this area and the number of the channel used by this wireless device. For example, the screen 112 shows that three wireless receivers (1) to (3) of the wireless receivers 21 are detected.

To check the infrared sensor transmitter 22, the setting person selects the transmitter ID and operates the confirm button on the wireless setter 23 in a step ST35. At this time, to enable the setting person to select the transmitter ID, the wireless setter 23 displays a screen which is different from the screen 112 and shows a list for the transmitter ID. In response to this operation, the wireless setter 23 sends a notice indicative of the setter ID of the wireless setter 23 and the selected transmitter ID, together with an LED blinking request, to the infrared sensor transmitter 22 (S303).

When receiving the notice and the LED blinking request, the infrared sensor transmitter 22 sends an acknowledgment ACK to the wireless setter 23 (S304). Thereafter, in a step ST36, the infrared sensor transmitter 22 blinks the LED which is provided exposed on a housing of the infrared sensor transmitter 22, for a predetermined period. Therefore, the setting person can visually confirm the infrared sensor transmitter 22 selected by the setting person.

While the screen 112 is displayed, the setting person selects the receiver ID and operates the setting button on the wireless setter 23 in a step ST37. For example, the receiver ID of "01234567" associated with the item (1) is selected. In response to this selection, the wireless setter 23 sends a notice indicative of the setter ID thereof and the selected receiver ID, together with a request for the transmitter ID, to the wireless receiver 21A (S305).

When receiving the notice of IDs and the request for the transmitter ID, the wireless receiver 21A sends a notice including the receiver ID of the wireless receiver 21A, the setter ID of the wireless setter which sends the request, and the transmitter ID stored in the wireless receiver 21A, to the wireless setter 23 (S306).

Figure 14:
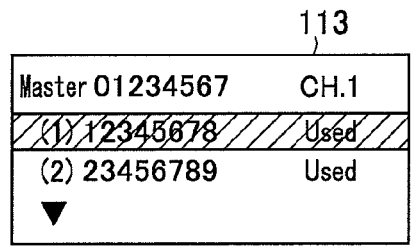
FIG. 14 is a diagram illustrating a screen displayed on the wireless setter in the ID deleting sequence in the above device control system.

When receiving the notice, the wireless setter 23 returns an acknowledgment ACK (S307). Next, in a step ST38, the wireless setter 23 displays a screen 113 shown in FIG. 14 and sounds the buzzer. In this situation, the wireless setter 23 waits deletion of the transmitter ID.

Thereafter, with regard to the wireless setter 23, in a step ST39, the transmitter ID shown in the screen 113 is selected and a clear button is operated. For example, the transmitter ID of "12345678" associated with the item (1) shown in the screen 113 is selected. In response to this operation, the wireless setter 23 sends a notice of the setter ID, the receiver ID, and the transmitter ID, together with a deleting request of the transmitter ID, to the wireless receiver 21A (S308).

When receiving the notice of IDs and the deleting request of the transmitter ID, the wireless receiver 21A returns an acknowledgment ACK (S309). In a step ST40, in response to the deleting request of the transmitter ID, the wireless receiver 21A deletes the transmitter ID indicated by the notice from a storage memory.

The wireless receiver 21 sends a notice of its own receiver ID and the setter ID, together with a deleting completion notice of the transmitter ID, to the wireless setter 23 (S310).

When receiving the notice of IDs and the deleting completion notice, the wireless setter 23 returns an acknowledge ACK (S311).

When receiving the acknowledgment ACK, the wireless receiver 21A blinks the LED for a predetermined period in a step ST41. Therefore, the setting person can visually confirm that the deleting the selected transmitter ID from the storage memory of the wireless receiver 21A is completed.

Figure 15:
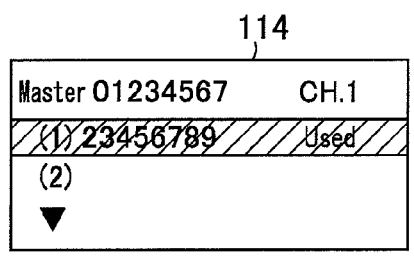
FIG. 15 is a diagram illustrating a screen displayed on the wireless setter in the ID deleting sequence in the above device control system.

Thereafter, in a step S42, as shown in FIG. 15, the wireless setter 23 displays a screen 114 which does not show the deleted transmitter ID with regard to the receiver ID of "01234567" of the wireless master, and the wireless setter 23 sounds the buzzer.

According to the ID deleting sequence described above, it is possible to delete the transmitter ID registered on the wireless receiver 21 in the step S22 in the ID registration sequence.

[Transmitter Address Setting Sequence]

Figure 16:
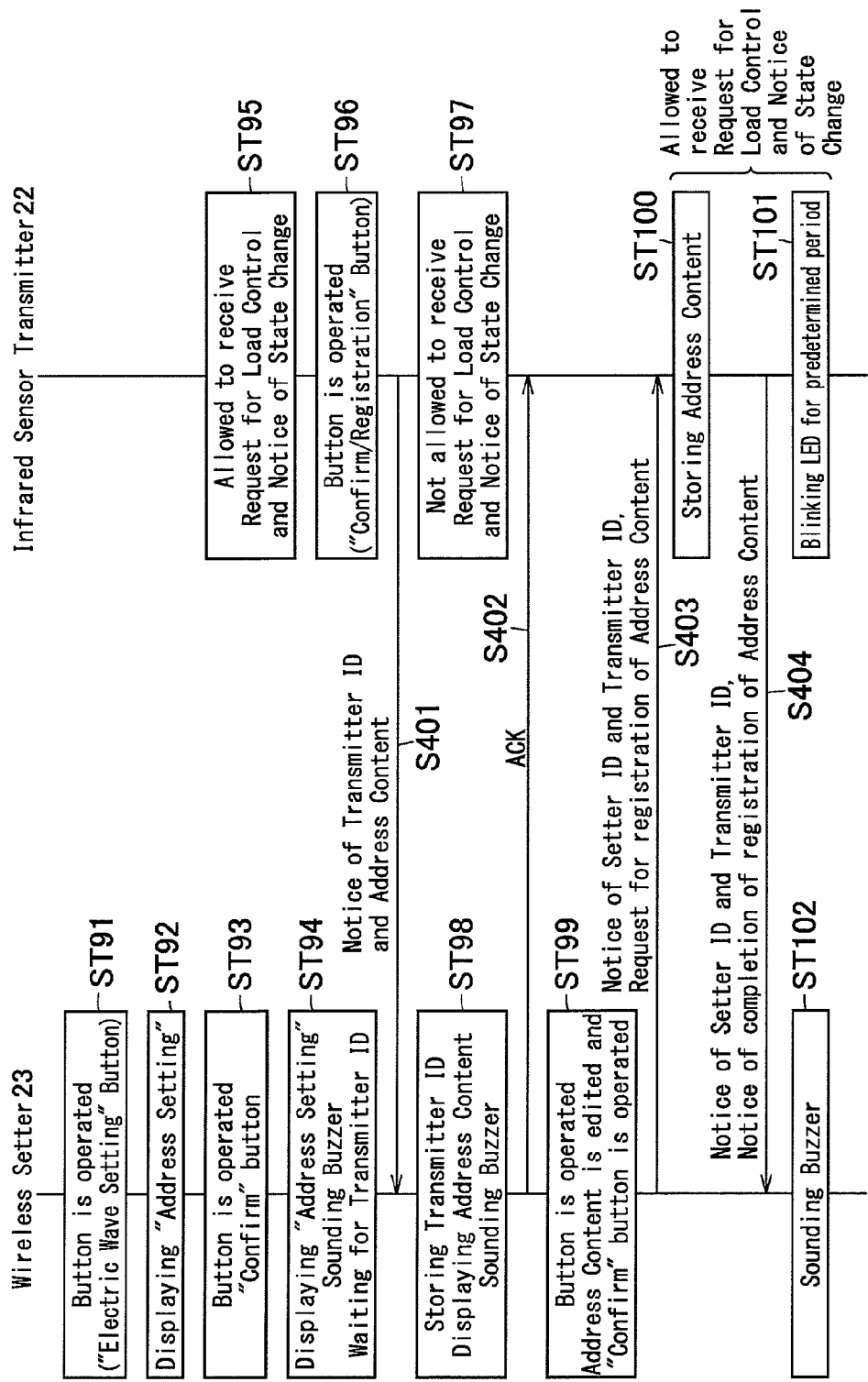
FIG. 16 is a sequence diagram illustrating procedure of setting an address to the infrared sensor transmitter in the above device control system.

Hereinafter, an explanation referring to FIG. 16 is made to an operation of setting an address to the infrared sensor transmitter 22 in the aforementioned device control system.

With regard to this transmitter address setting sequence, first in a step ST91, the setting person operates the electric wave setting button on the wireless setter 23. In response to this operation, the wireless setter 23 displays an address setting screen in a step ST92.

In a next step ST93, the setting person operates the confirm button of the wireless setter 23. In response to this operation, in a step ST94, the wireless setter 23 sounds the buzzer while displaying the address setting screen, and is in a state of waiting to receive the transmitter ID.

While the infrared sensor transmitter 22 is in a normal state, the infrared sensor transmitter 22 can receive the control request of the load device 5 to the wireless receiver 21, and also receive the state change notice (step ST95).

In a step ST96, while the infrared sensor transmitter 22 is in this state, the setting person operates the check/registration button of the infrared sensor transmitter 22. In response to this operation, the infrared sensor transmitter 22 sends a notice of its own transmitter ID and a content of the address, to the wireless setter 23 (S401). After that, in a step ST97, the infrared sensor transmitter 22 becomes in a state in which the infrared sensor transmitter 22 cannot receive the control request of the load device 5 and the state change notice.

When receiving the notice of the transmitter ID and the content of the address, the wireless setter 23 stores the received transmitter ID, and displays the received content of the address of the infrared sensor transmitter 22, and further sounds the buzzer, in a step ST98. In response to completion of receiving the notice of the transmitter ID and the content of the address, the wireless setter 23 returns an acknowledgment ACK (S402).

Next, in a step ST99, the setting person edits the content of the address stored in the wireless setter 23. An edit operation is performed with regard to the wireless setter 23 such that the content of the address is changed to an address which the setting person wants to allocate to the infrared sensor transmitter 22 in the electric wave wireless system 2. After that, the setting button of the wireless setter 23 is operated. In response to this operation, the wireless setter 23 sends a notice of its own setter ID and the transmitter ID, together with an address content registration request, to the infrared sensor transmitter 22 (S403).

When receiving the notice indicative of the setter ID of the wireless setter 23 and the transmitter ID, and the address content registration request, the infrared sensor transmitter 22 stores the content of the address in a step ST100. In response to completion of this storing, the infrared sensor transmitter 22 sends a notice of the setter ID and the transmitter ID, together with an address content registration completion notice, to the wireless setter 23 (S404). Subsequently, in a step ST101, the infrared sensor transmitter 22 blinks its own LED for a predetermined period. After completion of storing the content of the address in the step ST100, this infrared sensor transmitter 22 can receive the control request of the load device 5 and the state change notice.

When receiving the notice of the setter ID and the transmitter ID and the address content registration completion notice from the infrared sensor transmitter 22, the wireless setter 23 sounds the buzzer in a step ST102. Thereby, the wireless setter 23 notifies the setting person of completion of the address setting of the infrared sensor transmitter 22.

As described above, according to the transmitter address setting sequence, it is possible to set the transmitter address of the infrared sensor transmitter 22 after the button of the wireless setter 23 is operated in advance. Therefore, this setting procedure is plain to the setting person.

Further, according to this transmitter address setting sequence, the wireless setter 23 is kept in the state of waiting to receive the transmitter ID, and the infrared sensor transmitter 22 is operated to send the transmitter ID. Therefore, it is unnecessary to broadcast an address request from the wireless setter 23 to the infrared sensor transmitters 22. Consequently, all the infrared sensor transmitters 22 are not required to send the transmitter ID. For example, even when the infrared sensor transmitters 22 are battery-powered, waste power consumption can be reduced.

Additionally, according to this transmitter address setting sequence, in a period from the time of operating the button of the infrared sensor transmitter 22 to the time of storing the address, the infrared sensor transmitter 22 is kept in the state in which the infrared sensor transmitter 22 cannot receive the control request to the load device 5 and the state change notice. Therefore, it is possible to avoid that the load device 5 is controlled during the address setting of the infrared sensor transmitter 22.

Furthermore, according to this transmitter address setting sequence, the infrared sensor transmitter 22 blinks the LED for a predetermined period after storing the content of the address. Hence, it is possible to notify the setting person of the completion of setting of the content of the address. In this regard, the operation of blinking the LED by the infrared sensor transmitter 22 is started in response to an order generated inside the infrared sensor transmitter 22. This is because, in a case where the wireless setter 23 requests the operation of blinking the LED to the infrared sensor transmitter 22, the wireless setter 23 fails to request the operation of blinking the LED when the battery of the wireless setter 23 runs out immediately after the completion of storing the content of the address in the infrared sensor transmitter 22. In view of this case, the configuration of the present embodiment is employed to avoid that the notifying the setting person of the completion of the address setting fails.

[Normal Sequence]

Figure 17:
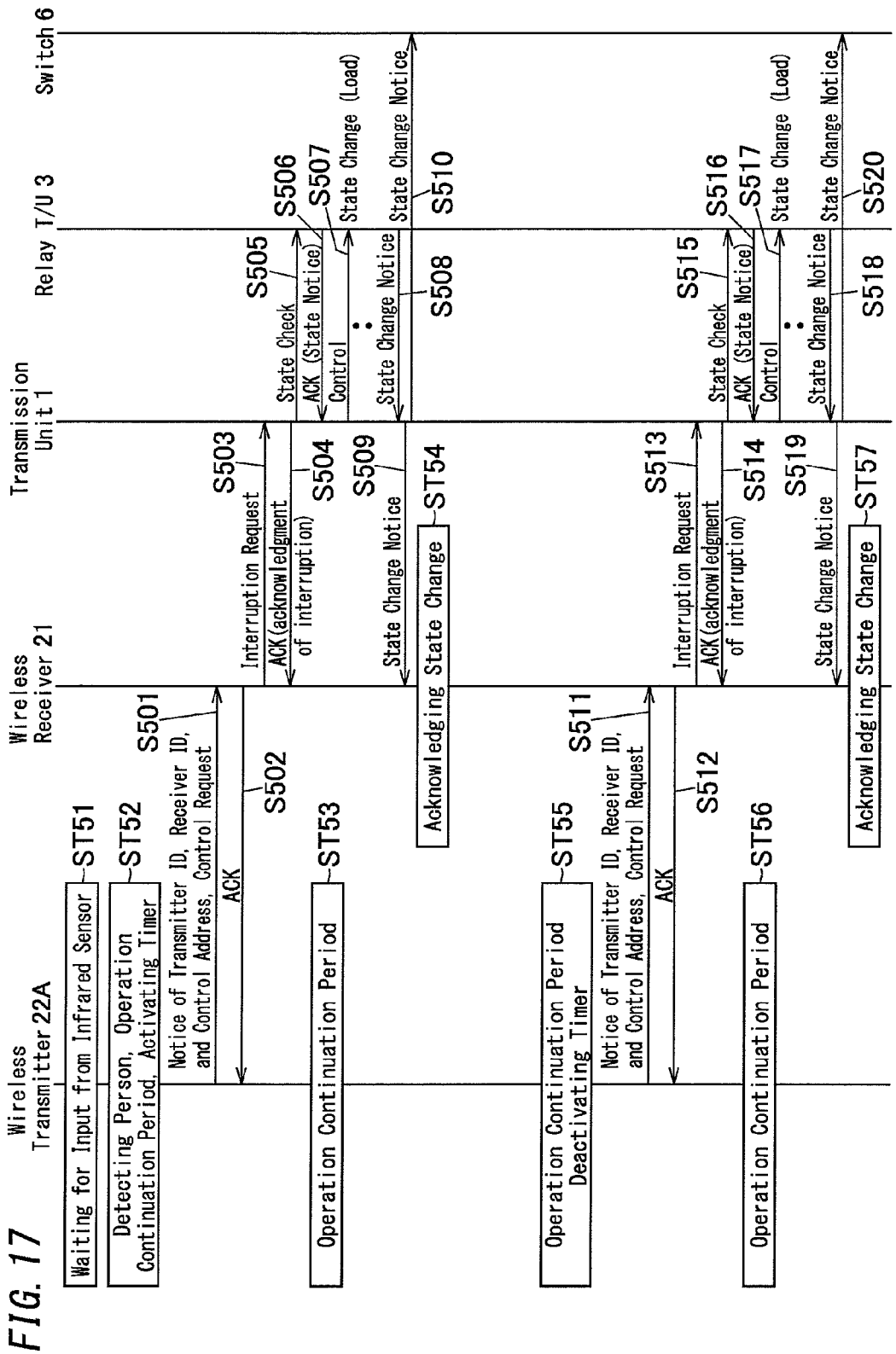
FIG. 17 is a sequence diagram illustrating procedure of turning on or off a load device in accordance with an input from an infrared sensor in the above device control system.
Figure 18:
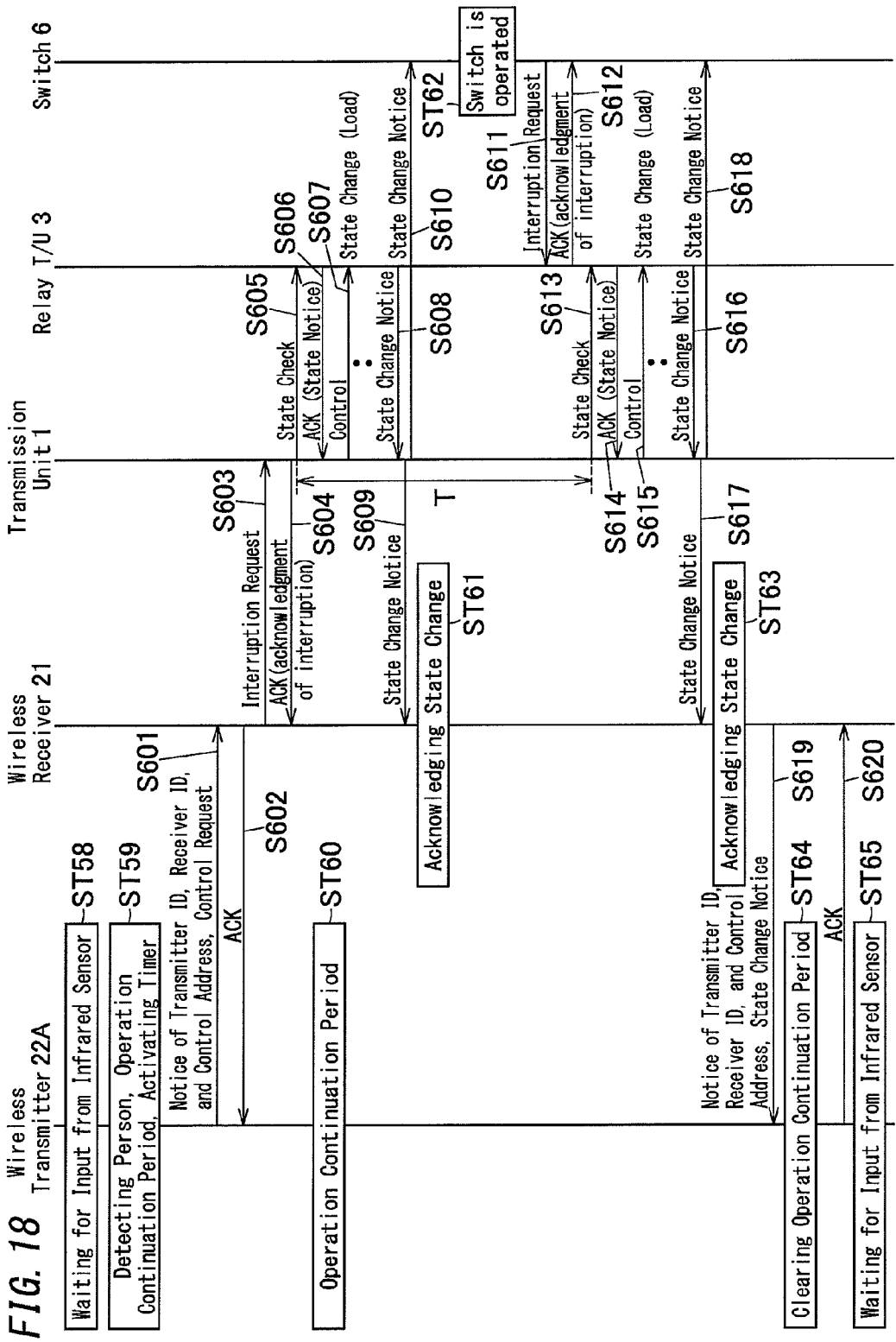
FIG. 18 is a sequence diagram illustrating procedure of turning on or off the load device in accordance with a manual operation of a switch in the above device control system.

The following explanation referring to FIGS. 17 and 18 is made to a normal sequence of the above device control system. In the normal sequence illustrated in FIGS. 17 and 18, the load device 5 is controlled in response to detection of a human body by the infrared sensor transmitter 22, and additionally, the load device 5 is controlled in response to a manual operation of the switch 6.

In a step ST51, the infrared sensor transmitter 22A of a plurality of infrared sensor transmitters 22 included in the electric wave wireless system 2 is in a state of waiting for an input from the incorporated infrared sensor.

In this state, when detecting a human body by the infrared sensor in a step ST52, the infrared sensor transmitter 22A operates a timer for a predetermined operation continuation period. Thus, in a step ST53, the infrared sensor transmitter 22A times the predetermined operation continuation period by the timer.

Further, the infrared sensor transmitter 22A sends a notice including the transmitter ID thereof, the registered (stored)

receiver ID, and a control address, and a control request (second control signal) of turning on the load device 5, to the wireless receiver 21 (S501).

In summary, the wireless slave 22 is configured to send to the wireless master 21 the second control signal indicative of an intended state of the load device 5. Especially, in the present embodiment, the wireless slave 22 is configured to determine whether a predetermined event has occurred, and when determining that the predetermined event has occurred send the second control signal to the wireless master 21. In the present embodiment, the predetermined event is an event that a human body has been detected.

Additionally, in the present embodiment, the wireless slave 22 is configured to perform an event determination process of determining periodically whether the predetermined event has occurred while the state of the load device 5 is a first state (extinction). Further, the wireless slave 22 is configured to, when determining that the predetermined event has occurred, send the second control signal indicative of a second state (lighting) different from the first state (extinction) as the intended state of the load device 5.

When receiving the notice of IDs and the control request (second control signal), the wireless receiver 21 returns an acknowledgment ACK (S502).

Next, the wireless receiver 21 sends an interruption request including the control address associated with the infrared sensor transmitter 22A. This interruption request is sent to the transmission unit 1 via the multiplexing signal line L (S503). Further, this interruption request includes the control request (second control signal) from the wireless transmitter 22. In brief, the wireless master (wireless receiver) 21 is configured to, upon receiving the second control signal from the wireless slave 22, send the second control signal to the device controller (transmission unit) 1.

When receiving the interruption request, the transmission unit 1 acknowledges the interruption and returns an acknowledgment ACK (S504).

Next, the transmission unit 1 sends, to the relay terminal unit 3, a state check signal for obtaining the state of the load device 5 associated with the control address of the infrared sensor transmitter 22 included in the interruption request (S505).

The relay terminal unit 3 returns a state notice signal indicative of the state of the load device 5 connected to the relay terminal unit 3 via the remote control relay 4, as an acknowledgment ACK (S506).

In other words, the terminal controller (relay terminal unit) 3 is configured to, when receiving the state check signal, send the state notice signal indicative of the current state of the load device 5 to the device controller (transmission unit) 1.

In response to reception of the acknowledgment ACK, the transmission unit 1 sends the control request (first control signal) for controlling the load device 5 associated with the infrared sensor transmitter 22 to the relay terminal unit 3 to respond the interruption request (S507).

In other words, the device controller (transmission unit) 1 is configured to, upon receiving the second control signal from the wireless master 21, output to the signal line (multiplexing signal line) L the first control signal corresponding to the second control signal (i.e., the first control signal indicative of the state which is the same as the intended state indicated by the second control signal).

When receiving the control request (first control signal), the relay terminal unit 3 operates the remote control relay 4 according to the control request to perform control of turning on the load device 5. Note that, when the infrared sensor transmitter 22 is associated with a plurality of load devices 5, the transmission unit 1 sends a plurality of control requests to at least one relay terminal unit 3.

After performing the control of turning on the load device 5 according to the control request, the relay terminal unit 3 sends the state change notice indicative of the state of the load device 5 after controlled, to the transmission unit 1 (S508).

As described above, the device control system of the present embodiment includes the terminal controller (relay terminal unit) 3 interposed between the load device 5 and the device controller 1. The terminal controller 3 is configured to, upon receiving the first control signal from the device controller 1 via the signal line L, control the load device 5 according to the received first control signal. The terminal controller 3 is configured to, after controlling the load device 5, send the change state notice to the device controller 1.

In response to reception of this state change notice, the transmission unit 1 sends the state change notice to the wireless receiver 21 and the switch 6 (S509 and S510).

In brief, the device controller 1 is configured to, when receiving the state change notice indicative of the current state of the load device 5 which is sent in response to the first control signal corresponding to the second control signal, send the received state change notice to the wireless master 21.

When receiving the state change notice, in a step ST54, the wireless receiver 21 acknowledges that the load device 5 has been controlled in response to the interruption request and that the state of the load device 5 has been changed.

As described above, when detecting a human body by the infrared sensor, the device control system can perform control of turning on the load device 5 associated with the infrared sensor transmitter 22A.

In a subsequent step ST55, the operation continuation period timed by the timer in the infrared sensor transmitter 22A ends. In response to this end, the infrared sensor transmitter 22A sends a notice of its own transmitter ID, the receiver ID, and the control address, together with the control request for turning off the load device 5, to the wireless receiver 21 (S511).

In response to reception of the notice of IDs and the control request, the wireless receiver 21 returns an acknowledgment ACK (S512).

In response to reception of the acknowledgment ACK, the infrared sensor transmitter 22A returns to the state of waiting for the input from the infrared sensor in a step ST56.

As described above, the wireless slave 22 is configured to send the second control signal indicative of the first state (extinction) as the intended state of the load device 5 after a lapse of the predetermined operation continuation period from the time of sending the second control signal. The wireless slave 22 is configured to, upon determining that the state of the load device 5 is the first state (extinction) after sending the second control signal, perform the event determination process.

Especially, in the present embodiment, the wireless master 21 is configured to, upon receiving the second control signal indicative of the first state (extinction) as the intended state of the load device 5, send the acknowledgement ACK to the wireless slave 22. The wireless slave 22 is configured to, upon receiving the acknowledgement ACK from the wireless master 21, determine that the state of the load device 5 is the first state.

Next, the wireless receiver 21 sends the interruption request including the control address of the infrared sensor transmitter 22A (S513). This interruption request is sent to the transmission unit 1 via the multiplexing signal line L.

When receiving the interruption request, the transmission unit 1 acknowledges the interruption and returns an acknowledgment ACK (S514).

Next, the transmission unit 1 sends, to the relay terminal unit 3, the state check signal for obtaining the state of the load device 5 associated with the control address of the infrared sensor transmitter 22 included in the interruption request (S515).

The relay terminal unit 3 returns the state notice signal indicative of the state of the load device 5 connected to the relay terminal unit 3 via the remote control relay 4, as an acknowledgment ACK (S516).

In response to reception of the acknowledgment ACK, the transmission unit 1 sends the control request (first control signal) for controlling the load device 5 associated with the infrared sensor transmitter 22 to the relay terminal unit 3 to respond the interruption request (S517).

When receiving the control request, the relay terminal unit 3 operates the remote control relay 4 according to the control request to perform control of turning off the load device 5. Note that, when the infrared sensor transmitter 22 is associated with a plurality of load devices 5, the transmission unit 1 sends a plurality of control requests to at least one relay terminal unit 3.

After performing the control of turning off the load device 5 according to the control request, the relay terminal unit 3 sends the state change notice indicative of the state of the load device 5 after controlled, to the transmission unit 1 (S518).

In response to reception of this state change notice, the transmission unit 1 sends the state change notice to the wireless receiver 21 and the switch 6 (S519 and S520).

When receiving the state change notice, in a step ST57, the wireless receiver 21 acknowledges that the load device 5 has been controlled in response to the interruption request and that the state of the load device 5 has been changed.

As described above, after a lapse of the predetermined operation continuation period from the time of detecting a human body by the infrared sensor, the device control system can perform control of turning off the load device 5 associated with the infrared sensor transmitter 22A.

Next, with regard to the device control system which operates in response to the input from the infrared sensor as described above, an operation responding to a manual operation of the switch 6 is described.

While the infrared sensor transmitter 22A is in the state of waiting for the input from the infrared sensor in a step ST58 (i.e., the wireless slave 22A performs the event determination process), the infrared sensor transmitter 22A operates the timer for the predetermined operation continuation period when detecting a human body by the infrared sensor in a step ST59. Thus, in a step ST60, the infrared sensor transmitter 22A times the predetermined operation continuation period by the timer.

Further, the infrared sensor transmitter 22A sends a notice including the transmitter ID thereof, the registered (stored) receiver ID, and a control address, and the control request of turning on the load device 5, to the wireless receiver 21 (S601).

When receiving the notice of IDs and the control request, the wireless receiver 21 returns an acknowledgment ACK (S602).

Next, the wireless receiver 21 sends the interruption request including the control address associated with the infrared sensor transmitter 22A (S603). This interruption request is sent to the transmission unit 1 via the multiplexing signal line L.

When receiving the interruption request, the transmission unit 1 acknowledges the interruption and returns an acknowledgment ACK (S604).

Next, the transmission unit 1 sends, to the relay terminal unit 3, the state check signal for obtaining the state of the load device 5 associated with the control address of the infrared sensor transmitter 22 included in the interruption request (S605).

The relay terminal unit 3 returns the state notice signal indicative of the state of the load device 5 connected to the relay terminal unit 3 via the remote control relay 4, as an acknowledgment ACK (S606).

In response to reception of the acknowledgment ACK, the transmission unit 1 sends the control request (first control signal) for controlling the load device 5 associated with the infrared sensor transmitter 22 to the relay terminal unit 3 to respond the interruption request (S607).

When receiving the control request, the relay terminal unit 3 operates the remote control relay 4 according to the control request to perform control of turning on the load device 5. Note that, when the infrared sensor transmitter 22 is associated with a plurality of load devices 5, the transmission unit 1 sends a plurality of control requests to at least one relay terminal unit 3.

After performing the control of turning on the load device 5 according to the control request, the relay terminal unit 3 sends the state change notice indicative of the state of the load device 5 controlled, to the transmission unit 1 (S608).

In response to reception of this state change notice, the transmission unit 1 sends the state change notice to the wireless receiver 21 and the switch 6 (S609 and S610).

When receiving the state change notice, in a step ST61, the wireless receiver 21 acknowledges that the load device 5 has been controlled in response to the interruption request and that the state of the load device 5 has been changed.

After the load device 5 is turned on as described above, the switch 6 is turned off by a user in a step ST62. In this case, the switch 6 sends an interruption request to the relay terminal unit 3 via the multiplexing signal line L (S611).

When receiving this interruption request, the relay terminal unit 3 acknowledges interruption, and returns an acknowledgment ACK (S612).

As described above, the device control system of the present embodiment includes the manual operation controller (switch) 6 connected to the signal line (multiplexing signal line) L. The manual operation controller 6 is configured to send the state change request to the terminal controller 3 via the signal line L. The state change request is a signal for requesting a change of the state of the load device 5. In this present embodiment, responding to an off-operation of a user, the manual operation controller 6 sends the state change request for requesting a change of the state of the load device 5 to the first state (extinction), to the terminal controller 3. Further, responding to an on-operation of a user, the manual operation controller 6 sends the state change request for requesting a change of the state of the load device 5 to the second state (lighting), to the terminal controller 3.

In this situation, the transmission unit 1 sends the state check signal to the relay terminal unit 3 (S613). This state check signal is sent after a lapse of a predetermined polling period T from a time of sending the previous state check signal.

As described above, the device controller 1 is configured to output the state check signal to the signal line L at a predetermined timing. The predetermined timing is a timing at which the predetermined polling period T elapses from the time of sending the previous state check signal.

Especially, in the present embodiment, the device controller 1 is configured to, after outputting the first control signal to the signal line L, output the state check signal to the signal line L before a lapse of the operation continuation period.

The relay terminal unit 3 sends the state notice signal indicative of a state in which the switch 6 is turned off, to the transmission unit 1, as an acknowledgment ACK (S614).

Accordingly, the terminal controller (relay terminal unit) 3 is configured to, when receiving the state check signal after receiving the state change request for requesting a change of the state of the load device 5, send the acknowledgment (third control signal) ACK indicative of the state requested by the state change request as the state of the load device 5.

In response to the state notice signal sent from the relay terminal unit 3, the transmission unit 1 sends the control signal to the relay terminal unit 3 to turn off the load device 5 (S615).

In other words, the device controller 1 is configured to, when receiving the third control signal indicative of the state of the load device 5 via the signal line L after sending the state check signal, output the first control signal corresponding to the third control signal (i.e., the first control signal indicative of the state which is the same as the intended state indicated by the third control signal) to the signal line L.

Accordingly, the relay terminal unit 3 operates the remote control relay 4 to turn off the load device 5 associated with the switch 6.

The relay terminal unit 3 performs control of turning off the load device 5 according to the control request (the first control signal corresponding to the third control signal), and then sends the state change notice indicative of the state of the load device 5 controlled to the transmission unit 1 (S616).

In response to reception of this state change notice, the transmission unit 1 sends the state change notice to the wireless receiver 21 and the switch 6 (S617 and S618).

In brief, the device controller 1 is configured to, when receiving the state change notice indicative of the current state of the load device 5 which is sent in response to the first control signal corresponding to the third control signal, send the received state change notice to the wireless master 21.

When receiving the state change notice, in a step ST63, the wireless receiver 21 acknowledges that the load device 5 has been controlled and that the state of the load device 5 has been changed.

When an event that the load device 5 is turned off irrespective of the control request from the infrared sensor transmitter 22A occurs, the wireless receiver 21 notifies the infrared sensor transmitter 22A associated with the load device 5 of the occurrence of the event. For example, the wireless receiver 21 sends a notice of the transmitter ID, the receiver ID, and the control address, together with the state change notice, to the infrared sensor transmitter 22A (S619).

Therefore, the wireless master 21 is configured to, when receiving the state change notice from the device controller 1, send the notice change state to the wireless slave 22 at a timing different from a timing at which the device controller 1 receives the state change notice.

In response to reception of this state change notice, the infrared sensor transmitter 22A returns an acknowledgment ACK (S620).

Further, the wireless slave 22 is configured to, when receiving the state change notice from the wireless master 21, determine whether the current state of the load device 5 indicated by the received state change notice is the first state (extinction).

In this instance, the current state of the load device 5 indicated by the received state change notice is the first state (extinction). Accordingly, the wireless slave 22 performs the event determination process.

Consequently, the infrared sensor transmitter 22A interrupts timing the operation continuation period in a step ST64, and is in the state of waiting for the input from the infrared sensor in a step ST65.

As described above, even when the state of the load device 5 is changed in response to not the input from the infrared sensor but the manual operation of the switch 6, the device control system can notify the infrared sensor transmitter 22A of the change of the state.

When detecting a human body by use of the infrared sensor transmitter 22A, the aforementioned device control system provides the control request from the transmission unit 1 to the relay terminal unit 3, thereby turning on the load device 5. Thereafter, after completion of timing the predetermined operation continuation period by the infrared sensor transmitter 22, the load device 5 is turned off.

Further, in this device control system, even when the interruption request is not provided from the wireless receiver 21 to the transmission unit 1, the transmission unit 1 performs a polling of sending the state check signal to the relay terminal unit 3, thereby receiving the state notice signal from the relay terminal unit 3.

When receiving the state change notice from the relay terminal unit 3, the transmission unit 1 sends the received state change notice to the wireless receiver 21. Further, this state change notice is sent from the wireless receiver 21 to the infrared sensor transmitter 22.

Consequently, when detecting a human body by the infrared sensor thereafter, the infrared sensor transmitter 22 can send the control request to turn on the load device 5.

The device control system of the present embodiment described above includes the device controller 1, a plurality of devices 5 to be controlled, a plurality of wireless slaves 22, and the wireless master 21. Each of the plurality of devices 5 to be controlled is controlled by the first control signal sent from the device controller 1. Each of the plurality of wireless slaves 22 is associated with a corresponding one of the plurality of devices 5 to be controlled and outputs the second signal for operating the corresponding device 5 to be controlled. The wireless master 21 is connected to the device controller 1 in a wired manner, and is connected to the plurality of wireless slaves 22 in a wireless manner. The wireless slave 22 changes the transmission content of the second control signal according to the state change notice of the device 5 to be controlled associated with this wireless slave 22. In response to reception of the second control signal sent from the wireless slave 22 by way of the wireless master 21, the device controller 1 sends the first control signal to the device 5 to be controlled associated with this wireless slave 22. In response to reception of the state change notice as a reply of sending the state check signal to the device 5 to be controlled, the device controller 1 sends the state change notice to the wireless master 21 connected in a wireless manner to the wireless slave 22 associated with this device 5 to be controlled. The wireless master 21 sends, to the wireless slave 22, the state change notice of the device 5 to be controlled associated with the wireless slave 22 at the timing different from the timing at which the device controller 1 receives the state change notice after sending the state check signal.

In other words, the device control system of the first aspect in accordance with the present invention includes the device controller 1, the wireless master 21, and the wireless slave 22. The device controller 1 is to be connected to the load device 5 via the signal line L. The device controller 1 is configured to output to the signal line the first control signal for controlling the load device 5. The wireless master 21 is connected to the device controller 1 via the signal line L. The wireless master 21 is configured to perform wired communication with the device controller 1. The wireless slave 22 is configured to perform wireless communication with the wireless master 21. The wireless slave 22 is configured to send to the wireless master 21 the second control signal indicative of an intended state of the load device 5. The wireless master 21 is configured to, when receiving the second control signal from the wireless slave 22, send the second control signal to the device controller 1. The device controller 1 is configured to, when receiving the second control signal from the wireless master 21, output to the signal line L the first control signal corresponding to the second control signal. The device controller 1 is configured to, when receiving the state change notice indicative of the current state of the load device 5 after sending the first control signal corresponding to the second control signal, send the received state change notice to the wireless master 21. The device controller 1 is configured to output the state check signal to the signal line L at the predetermined timing. The device controller 1 is configured to, when receiving the third control signal indicative of an intended state of the load device 5 via the signal line L after sending the state check signal, output the first control signal corresponding to the third control signal to the signal line L. The device controller 1 is configured to, when receiving the state change notice after sending the first control signal corresponding to the third control signal, send the received state change notice to the wireless master 21. The wireless master 21 is configured to, when receiving the state change notice from the device controller 1, send the received state change notice to the wireless slave 22.

According to this device control system, as shown in FIGS. 17 and 18, the state change notice of the load device 5 is sent to the infrared sensor transmitter 22. The timing of sending this state change notice is different from the timing of polling performed by the transmission unit 1 with regard to the relay terminal unit 3.

Therefore, according to this device control system, the state change notice is sent to the infrared sensor transmitter 22 at the timing different from the timing of the wired polling communication. Hence, the response speed in the entire device control system can be increased.

In other words, in the present embodiment, the state change notice of the device 5 to be controlled associated with the wireless slave 22 is sent from the wireless master 21 to the wireless slave 22 at the timing different from the timing at which the device controller 1 receives the state change notice after sending the state check signal. Accordingly, it is possible to provide an improved response speed in communication even when a wireless terminal is separated into a transmitter and a receiver.

Besides, the wireless control apparatus 21 of the present embodiment is a wireless control apparatus which is connected to the device controller 1 in a wired manner and is connected to the plurality of wireless slaves 2 in a wireless manner. The device controller 1 is configured to send the first control signal to the device 5 to be controlled, and receive the state change notice as a reply of sending the state check signal to the device 5 to be controlled. Each of the plurality of wireless slaves 22 is configured to output the second control signal for operating the device 5 to be controlled. The wireless control apparatus 21 receives the state change notice from the device controller 1, and sends, to the wireless slave 22, the state change notice of the device 5 to be controlled associated with this wireless slave 22 at the timing different from the timing at which the device controller 1 receives the state change notice after sending the state check signal.

In other words, the wireless control apparatus 21 of the present embodiment is a wireless control apparatus which is to be connected to the device controller 1 via the signal line L and is configured to perform wired communication with the device controller 1 and to perform wireless communication with the wireless slave 22. The device controller 1 is to be connected to the load device 5 via the signal line L and is configured to output to the signal line L the first control signal for controlling the load device 5. The wireless slave 22 is configured to send to the wireless control apparatus 21 the second control signal indicative of an intended state of the load device 5. The wireless control apparatus 21 is configured to, when receiving the second control signal from the wireless slave 22, send the second control signal to the device controller 1. The device controller 1 is configured to, when receiving the second control signal from the wireless control apparatus 21, output to the signal line L the first control signal corresponding to the second control signal. The device controller 1 is configured to, when receiving the state change notice indicative of the current state of the load device 5 after sending the first control signal corresponding to the second control signal, send the received state change notice to the wireless master 21. The device controller 1 is configured to output the state check signal to the signal line L at the predetermined timing. The device controller 1 is configured to, when receiving the third control signal indicative of an intended state of the load device 5 via the signal line L after sending the state check signal, output the first control signal corresponding to the third control signal to the signal line L. The device controller 1 is configured to, when receiving the state change notice after sending the first control signal corresponding to the third control signal, send the received state change notice to the wireless master 21. The wireless master 21 is configured to, when receiving the state change notice from the device controller 1, send the received state change notice to the wireless slave 22.

Additionally, in the device control system of the present embodiment, the wireless master 21 stores the device state of the device 5 to be controlled, and the association information between the device 5 to be controlled and the wireless slave 22. The wireless master 21 sends the state check notice to the wireless slave 22 only when the device state of the device 5 to be controlled has been changed.

In other words, the wireless master 21 is configured to store the current state of the load device 5 and the correspondence relation between the load device 5 and the wireless slave 22. The wireless master 21 is configured to, when receiving the state change notice from the device controller 1, determine whether the current state of the load device 5 indicated by the state change notice is identical to the current state of the load device 5 stored. The wireless master 21 is configured to, when determining that the current state of the load device 5 indicated by the state change notice is not identical to the current state of the load device 5 stored, send the received state change notice to the wireless slave 22 corresponding to the load device 5 indicated by the received state change notice.

In summary, in this device control system, it is preferable that the wireless receiver 21 store the device state of the load device 5 and the association information of the load device 5 and the infrared sensor transmitter 22.

For achieving this purpose, the wireless receiver 21 stores the correspondence relation between the infrared sensor transmitter 22 and the load device 5 in the sequence of storing the transmitter ID as described above. Further, each time the wireless receiver 21 receives the state change notice of the load device 5 from the transmission unit 1, the wireless receiver 21 associates the state of the load device 5 with the infrared sensor transmitter 22.

The wireless receiver 21 monitors the state change of the load device 5 associated with the infrared sensor transmitter 22 which is connected in a wireless manner to this wireless receiver 21. The wireless receiver 21 sends the state change notice to the infrared sensor transmitter 22 only when the state change of the load device 5 associated with the infrared sensor transmitter 22 connected in a wireless manner to this wireless receiver 21 occurs.

Consequently, the infrared sensor transmitter 22 can end timing the operation continuation period in response to the state change notice, and can change the content of the next control request.

According to the device control system described above, it is possible to reduce the number of times of wireless communication in which the wireless receiver 21 sends signals to the infrared sensor transmitter 22. Therefore power consumption can be reduced. In a case where the infrared sensor transmitter 22 is battery-powered, it is possible to prolong a period until next replacements of batteries.

The next explanation referring to FIG. 19 is made to the above normal sequence with respect to a case where the two infrared sensor transmitters 22A and 22B allowed to be connected in a wireless manner to the single wireless receiver 21 have the same address (i.e., the same control address is allocated to the infrared sensor transmitters 22A and 22B). In brief, in the case shown in FIG. 19, a plurality of different infrared sensor transmitters 22 are associated with the same load device 5.

At first, each of the infrared sensor transmitters 22A and 22B is in the state of waiting for an input from an infrared sensor thereof (steps ST71 and ST72).

When detecting a human body by the infrared sensor in a step ST73 while being in the state of waiting for the input from the infrared sensor in a step ST58, the infrared sensor transmitter 22A operates its timer for the predetermined operation continuation period. Thus, in a step ST74, the infrared sensor transmitter 22A times the predetermined operation continuation period by the timer.

Further, the infrared sensor transmitter 22A sends a notice including the transmitter ID thereof, the registered (stored) receiver ID, and the control address, together with the control request (second control signal) of turning on the load device 5, to the wireless receiver 21 (S701).

When receiving the notice of IDs and the control request, the wireless receiver 21 returns an acknowledgment ACK (S702).

Next, the wireless receiver 21 sends the interruption request including the control address associated with the infrared sensor transmitter 22A (S703).

This interruption request is sent to the transmission unit 1 via the multiplexing signal line L. When receiving the interruption request, the transmission unit 1 acknowledges the interruption and returns an acknowledgment ACK (S704).

At this time, the wireless receiver 21 can detect the state change of the load device 5 based on the control request (second control signal) sent from the infrared sensor transmitter 22A. For example, this wireless receiver 21 considers the detection output (input signal) from the infrared sensor transmitter 22A serving as the wireless slave of the wireless receiver 21, as the state change of the load device 5 associated with the infrared sensor transmitter 22A.

In other words, the wireless master 21 is configured to, when receiving the second control signal from the wireless slave 22, store the intended state of the load device 5 indicated by the second control signal as the current state of the load device 5.

Consequently, the wireless receiver 21 acknowledges that the load device 5 has been turned on in response to the control request.

Next, the transmission unit 1 sends, to the relay terminal unit 3, the state check signal for obtaining the state of the load device 5 associated with the control address of the infrared sensor transmitter 22A included in the interruption request (S705).

The relay terminal unit 3 returns the state notice signal indicative of the state of the load device 5 connected to the relay terminal unit 3 via the remote control relay 4, as an acknowledgment ACK (S706).

In response to reception of the acknowledgment ACK, the transmission unit 1 sends the control signal (first control signal) for controlling the load device 5 associated with the infrared sensor transmitter 22A, to the relay terminal unit 3 to respond the interruption request (S707).

When receiving the control signal, the relay terminal unit 3 operates the remote control relay 4 according to the control signal to perform control of turning on the load device 5. Note that, when the infrared sensor transmitter 22A is associated with a plurality of load devices 5, the transmission unit 1 sends a plurality of control requests to at least one relay terminal unit 3.

After performing the control of turning on the load device 5 according to the control signal, the relay terminal unit 3 sends the state change notice indicative of the state of the load device 5 after controlled, to the transmission unit 1 (S708).

In response to reception of this state change notice, the transmission unit 1 sends the state change notice to the wireless receiver 21 (S709).

When receiving the state change notice, in a step ST75, the wireless receiver 21 acknowledges that the load device 5 has been controlled in response to the interruption request and that the state of the load device 5 has been changed. In this regard, the wireless receiver 21 does not send the state change notice to the wireless sensor transmitters 22A and 22B at this time. Therefore, the wireless sensor transmitters 22A and 22B do not aware of the state change of the load device 5.

Thereafter, when detecting a human body by the infrared sensor in a step ST76, the infrared sensor transmitter 22B operates its timer for the predetermined operation continuation period. Thus, in a step ST77, the infrared sensor transmitter 22B times the predetermined operation continuation period by the timer.

Further, the infrared sensor transmitter 22B sends a notice including the transmitter ID thereof, the registered (stored) receiver ID, and the control address, and the control request (second control signal) of turning on the load device 5, to the wireless receiver 21 (S710).

When receiving the notice of IDs and the control request, the wireless receiver 21 returns an acknowledgment ACK (S711).

At this time, the wireless receiver 21 can detect the state change of the load device 5 based on the control request (second control signal) sent from the infrared sensor transmitter 22B. For example, this wireless receiver 21 considers the detection output (input signal) from the infrared sensor transmitter 22 serving as the wireless slave of the wireless receiver 21, as the state change of the load device 5 associated with the infrared sensor transmitter 22. Consequently, the wireless receiver 21 acknowledges that the load device 5 has been turned on in response to the control request.

Next, the wireless receiver 21 sends the interruption request including the control address associated with the infrared sensor transmitter 22B (i.e., identical to the control address associated with the infrared sensor transmitter 22A) (S712). This interruption request is sent to the transmission unit 1 via the multiplexing signal line L.

When receiving the interruption request, the transmission unit 1 acknowledges the interruption and returns an acknowledgment ACK (S713).

Next, the transmission unit 1 sends, to the relay terminal unit 3, the state check signal for obtaining the state of the load device 5 associated with the control address of the infrared sensor transmitter 22B included in the interruption request (S714).

The relay terminal unit 3 returns the state notice signal indicative of the state of the load device 5 connected to the relay terminal unit 3 via the remote control relay 4, as an acknowledgment ACK (S715).

In response to reception of the acknowledgment ACK, the transmission unit 1 sends the control signal (first control signal) for controlling the load device 5 associated with the infrared sensor transmitter 22B to the relay terminal unit 3 to respond the interruption request (S716).

When receiving the control signal, the relay terminal unit 3 operates the remote control relay 4 according to the control signal to perform control of turning on the load device 5. However, the load device 5 has been turned on in response to the control request generated by the infrared sensor transmitter 22A. Therefore, the state change does not occur in response to the control signal sent presently.

After performing the control of turning on the load device 5 according to the control signal, the relay terminal unit 3 sends the state change notice indicative of the state of the load device 5 after controlled, to the transmission unit 1 (S717).

In response to reception of this state change notice, the transmission unit 1 sends the state change notice to the wireless receiver 21 (S718).

In a subsequent step ST79, the operation continuation period timed by the timer in the infrared sensor transmitter 22A ends. In response to this end, the infrared sensor transmitter 22A sends a notice indicative of the transmitter ID thereof, the receiver ID, and the control address, together with the control request for turning off the load device 5, to the wireless receiver 21 (S719).

In response to reception of the notice of IDs and the control request, the wireless receiver 21 returns an acknowledgment ACK (S720).

In response to reception of the acknowledgment ACK, the infrared sensor transmitter 22A returns to the state of waiting for the input from the infrared sensor in a step ST80.

Whereas, the wireless receiver 21 also received the control request from the infrared sensor transmitter 22B having the same address of the infrared sensor transmitter 22A. The operation continuation period of the infrared sensor transmitter 22B does not end, and therefore the wireless receiver 21 does not perform control of turning off the load device 5.

In a subsequent step ST81, the operation continuation period timed by the timer in the infrared sensor transmitter 22B ends. In response to this end, the infrared sensor transmitter 22B sends a notice indicative of the transmitter ID thereof, the receiver ID, and the control address, together with the control request for turning off the load device 5, to the wireless receiver 21 (S721).

In response to reception of the notice of IDs and the control request, the wireless receiver 21 returns an acknowledgment ACK (S722).

In response to reception of the acknowledgment ACK, the infrared sensor transmitter 22B returns to the state of waiting for the input from the infrared sensor in a step ST82.

Next, the wireless receiver 21 sends the interruption request including the control address of the infrared sensor transmitter 22B (S723). This interruption request is sent to the transmission unit 1 via the multiplexing signal line L.

When receiving the interruption request, the transmission unit 1 acknowledges the interruption and returns an acknowledgment ACK (S724).

Next, the transmission unit 1 sends, to the relay terminal unit 3, the state check signal for obtaining the state of the load device 5 associated with the control address of the infrared sensor transmitter 22B included in the interruption request (S725).

The relay terminal unit 3 returns the state notice signal indicative of the state of the load device 5 connected to the relay terminal unit 3 via the remote control relay 4, as an acknowledgment ACK (S726).

In response to reception of the acknowledgment ACK, the transmission unit 1 sends the control signal (first control signal) for controlling the load device 5 associated with the infrared sensor transmitter 22B to the relay terminal unit 3 to respond the interruption request (S727).

When receiving the control signal, the relay terminal unit 3 operates the remote control relay 4 according to the control signal to perform control of turning off the load device 5.

After performing the control of turning off the load device 5 according to the control signal, the relay terminal unit 3 sends the state change notice indicative of the state of the load device 5 after controlled, to the transmission unit 1 (S728).

In response to reception of this state change notice, the transmission unit 1 sends the state change notice to the wireless receiver 21 (S729).

When receiving the state change notice, in a step ST83, the wireless receiver 21 acknowledges that the load device 5 has been controlled in response to the interruption request and that the state of the load device 5 has been changed.

As describe above, even in a case where the same address is allocated to a plurality of infrared sensor transmitters 22, this device control system can operate the load device 5 when any of such a plurality of infrared sensors detects a human. Further, the device control system can keep operating the load device until a lapse of the operation continuation period of the infrared sensor transmitter 2 which has detected a human body subsequently.

Moreover, according to the device control system of the present embodiment, the wireless master 21 detects the state change of the device 5 to be controlled, based on the second control signal detected by the wireless slave 22 connected in a wireless manner to this wireless master 21.

In other words, the wireless master 21 is configured to, when receiving the second control signal from the wireless slave 22, store the intended state of the load device 5 indicated by the second control signal as the current state of the load device 5.

In brief, according to this device control system, responding to an event that the infrared sensor transmitter 22 provides the control request, the wireless receiver 21 can determine the state of the load device 5 based on this control request.

Therefore, according to this device control system, the wireless receiver 21 can acknowledge the state of the load device 5 without receiving the state change notice from the transmission unit 1.

Note that, the aforementioned embodiment is one example of the present invention. Therefore, the present invention is not limited to the aforementioned embodiment. Obviously, various modifications out of the scope of this embodiment are available according to designs unless they are not deviated from the technical concept of the present invention.

The explanation of the aforementioned device control system is made with reference to a case that the load device 5 is a lighting fixture and the electric wave wireless system 2 includes an infrared sensor. However, the device control system is not limited to the above case. For example, the electric wave wireless system 2 may include an infrared sensor, and the load device 5 may be an air conditioner. Alternatively, the electric wave wireless system 2 may include a temperature sensor or a time clock (timer), and the load device 5 may be an air conditioner. Alternatively, the electric wave wireless system 2 may include a light sensor, and the load device 5 may be a lighting fixture.

In summary, the predetermined event of the wireless slave 22 may be that a temperature, time, or luminance exceeds a threshold or falls below a threshold, or may be detection of a predetermined object.

Note that, each of the wireless receiver 21, the infrared sensor transmitter 22, and the transmission unit 1 as described above is a computer including a memory, a communication I/F circuit, a CPU, and a program, and the CPU executes the program. Accordingly, the programs of the wireless receiver 21, the infrared sensor transmitter 22, and the transmission unit 1 enable the aforementioned operations.

Particularly, the program of the wireless receiver 21 enables the wireless receiver 21 to execute a step of receiving the state change notice from the transmission unit 1. Thereafter, the program of the infrared sensor transmitter 22 enables the infrared sensor transmitter 22 to execute a step of sending, to the wireless slave 22, the state change notice of the load device 5 associated with the infrared sensor transmitter 22 at the timing different from the timing at which the transmission unit 1 receives the state change notice after sending the state check signal.

In other words, a program of the wireless control apparatus 21 according to the present embodiment is a program for a wireless control apparatus which is connected in a wired manner to the device controller 1 and is connected in a wireless manner to a plurality of wireless slaves 22. The device controller 1 outputs the first control signal to the device 5 to be controlled, and receives the state change notice as a reply to sending the state check signal to the device 5 to be controlled. Each of the plurality of wireless slaves 22 outputs the second control signal for operating the device 5 to be controlled. This program enables a computer of the wireless control apparatus 21 to execute steps of: receiving the state change notice from the device controller 1; and sending, to the wireless slave 22, the state change notice of the device 5 to be controlled associated with the wireless slave 22 at the timing different from the timing at which the device controller 1 receives the state change notice after sending the state check signal.

Alternatively, a computer readable recording medium is a computer readable recording medium storing a program used in a computer which is connected to the device controller 1 via the signal line L and is used for performing wired communication with the device controller 1 and wireless communication with the wireless slave 22. The program enables the computer to act as the wireless control apparatus 21. The device controller 1 is to be connected to the load device 5 via the signal line L and is configured to output to the signal line L the first control signal for controlling the load device 5. The wireless slave 22 is configured to send to the wireless control apparatus 21 the second control signal indicative of an intended of the load device 5. The wireless control apparatus 21 is configured to, when receiving the second control signal from the wireless slave 22, send the second control signal to the device controller 1. The device controller 1 is configured to, when receiving the second control signal from the wireless control apparatus 21, output to the signal line L the first control signal corresponding to the second control signal. The device controller 1 is configured to, when receiving the state change notice indicative of the current state of the load device 5 after sending the first control signal corresponding to the second control signal, send the received state change notice to the wireless master control master 21. The device controller 1 is configured to output the state check signal to the signal line L at the predetermined timing. The device controller 1 is configured to, when receiving the third control signal indicative of an intended state of the load device 5 via the signal line L after sending the state check signal, output the first control signal corresponding to the third control signal to the signal line L. The device controller 1 is configured to, when receiving the state change notice after sending the first control signal corresponding to the third control signal, send the received state change notice to the wireless master 21. The wireless master 21 is configured to, when receiving the state change notice from the device controller 1, send the received state change notice to the wireless slave 22.

The invention claimed is:

1. A device control system, comprising:
a device controller which is to be connected to a load device via a signal line and is configured to output to the signal line a first control signal for controlling the load device;
a wireless master which is connected to the device controller via the signal line and is configured to perform wired communication with the device controller; and
a wireless slave configured to perform wireless communication with the wireless master,
wherein:
the wireless slave is configured to send to the wireless master a second control signal indicative of an intended state of the load device;
the wireless master is configured to, when receiving the second control signal from the wireless slave, send the second control signal to the device controller;
the device controller is configured to, when receiving the second control signal from the wireless master, output to the signal line the first control signal corresponding to the second control signal;
the device controller is configured to, when receiving a state change notice indicative of a current state of the load device after sending the first control signal corresponding to the second control signal, send the received state change notice to the wireless master;
the device controller is configured to output a state check signal to the signal line at a predetermined timing;
the device controller is configured to, when receiving a third control signal indicative of an intended state of the load device via the signal line after sending the state check signal, output the first control signal corresponding to the third control signal to the signal line;
the device controller is configured to, when receiving the state change notice after sending the first control signal corresponding to the third control signal, send the received state change notice to the wireless master; and
the wireless master is configured to, when receiving the state change notice from the device controller, send the received state change notice to the wireless slave.

2. The device control system as set forth in claim 1, wherein:
- the wireless master is configured to store the current state of the load device and a correspondence relation between the load device and the wireless slave;
- the wireless master is configured to, when receiving the state change notice from the device controller, determine whether the current state of the load device indicated by the state change notice is identical to the current state of the load device stored; and
- the wireless master is configured to, when determining that the current state of the load device indicated by the state change notice is not identical to the current state of the load device stored, send the received state change notice to the wireless slave corresponding to the load device indicated by the received state change notice.

3. The device control system as set forth in claim 1, wherein the wireless master is configured to, when receiving the second control signal from the wireless slave, store the intended state of the load device indicated by the second control signal as the current state of the load device.

4. The device control system as set forth in claim 1, wherein the wireless slave is configured to determine whether a predetermined event has occurred, and when determining that the predetermined event has occurred send the second control signal to the wireless master.

5. The device control system as set forth in claim 4, wherein:
- the wireless slave is configured to perform an event determination process of determining periodically whether the predetermined event has occurred while a state of the load device is a first state; and
- the wireless slave is configured to, when determining that the predetermined event has occurred, send the second control signal indicative of a second state different from the first state as the intended state of the load device.

6. The device control system as set forth in claim 5, wherein:
- the wireless slave is configured to send the second control signal indicative of the first state as the intended state of the load device after a lapse of a predetermined operation continuation period from time of sending the second control signal; and
- the wireless slave is configured to, when determining that a state of the load device is the first state after sending the second control signal, perform the event determination process.

7. The device control system as set forth in claim 6, wherein:
- the wireless master is configured to, when receiving the second control signal indicative of the first state as the intended state of the load device, send an acknowledgement to the wireless slave; and
- the wireless slave is configured to, when receiving the acknowledgement from the wireless master, determine that a state of the load device is the first state.

8. The device control system as set forth in claim 6, wherein the wireless slave is configured to, when receiving the state change notice from the wireless master, determine whether the current state of the load device indicated by the received state change notice is the first state.

9. The device control system as set forth in claim 6, wherein the device controller is configured to, after outputting the first control signal to the signal line, output the state check signal to the signal line before a lapse of the operation continuation period.

10. The device control system as set forth in claim 1, wherein:
- the device control system further comprises a terminal controller interposed between the load device and the device controller;
- the terminal controller is configured to, when receiving the first control signal from the device controller via the signal line, control the load device according to the received first control signal; and
- the terminal controller is configured to, after controlling the load device, send the change state notice to the device controller.

11. The device control system as set forth in claim 10, wherein the terminal controller is configured to, when receiving the state check signal when having received a state change request for requesting a change of a state of the load device, send, to the device controller, the third control signal indicative of a state requested by the state change request as the intended state of the load device.

12. The device control system as set forth in claim 11, wherein:
- the device control system further comprises a manual operation controller connected to the signal line; and
- the manual operation controller is configured to send the state change request to the terminal controller via the signal line.

13. A wireless control apparatus to be connected to a device controller via a signal line and configured to perform wired communication with the device controller and to perform wireless communication with a wireless slave,
wherein:
- the device controller is to be connected to a load device via the signal line and is configured to output to the signal line a first control signal for controlling the load device;
- the wireless slave is configured to send to the wireless control apparatus a second control signal indicative of an intended state of the load device;
- the wireless control apparatus is configured to, when receiving the second control signal from the wireless slave, send the second control signal to the device controller;
- the device controller is configured to, when receiving the second control signal from the wireless control apparatus, output to the signal line the first control signal corresponding to the second control signal;
- the device controller is configured to, when receiving a state change notice indicative of a current state of the load device after sending the first control signal corresponding to the second control signal, send the received state change notice to the wireless control apparatus;
- the device controller is configured to output a state check signal to the signal line at a predetermined timing;
- the device controller is configured to, when receiving a third control signal indicative of an intended state of the load device via the signal line after sending the state check signal, output the first control signal corresponding to the third control signal to the signal line;
- the device controller is configured to, when receiving the state change notice after sending the first control signal corresponding to the third control signal, send the received state change notice to the wireless control apparatus; and
- the wireless control apparatus is configured to, when receiving the state change notice from the device controller, send the received state change notice to the wireless slave.

14. A computer readable recording medium storing a program used in a computer which is connected to a device controller via a signal line and is used for performing wired communication with the device controller and wireless communication with a wireless slave,
wherein:
the program enables the computer to act as a wireless control apparatus;
the device controller is to be connected to a load device via the signal line and is configured to output to the signal line a first control signal for controlling the load device;
the wireless slave is configured to send to the wireless control apparatus a second control signal indicative of an intended of the load device;
the wireless control apparatus is configured to, when receiving the second control signal from the wireless slave, send the second control signal to the device controller;
the device controller is configured to, when receiving the second control signal from the wireless control apparatus, output to the signal line the first control signal corresponding to the second control signal;
the device controller is configured to, when receiving a state change notice indicative of a current state of the load device after sending the first control signal corresponding to the second control signal, send the received state change notice to the wireless control apparatus;
the device controller is configured to output a state check signal to the signal line at a predetermined timing;
the device controller is configured to, when receiving a third control signal indicative of an intended state of the load device via the signal line after sending the state check signal, output the first control signal corresponding to the third control signal to the signal line;
the device controller is configured to, when receiving the state change notice after sending the first control signal corresponding to the third control signal, send the received state change notice to the wireless control apparatus; and
the wireless control apparatus is configured to, when receiving the state change notice from the device controller, send the received state change notice to the wireless slave.

* * * * *